US012623653B2

(12) United States Patent
King

(10) Patent No.: US 12,623,653 B2
(45) Date of Patent: May 12, 2026

(54) GPS ENGINE CONTROL

(71) Applicant: Textron Inc., Providence, RI (US)

(72) Inventor: Russell William King, Evans, GA (US)

(73) Assignee: Textron Innovations Inc., Providence, RI (US)

( * ) Notice: Subject to any disclaimer, the term of this patent is extended or adjusted under 35 U.S.C. 154(b) by 291 days.

(21) Appl. No.: 17/840,101

(22) Filed: Jun. 14, 2022

(65) Prior Publication Data

US 2022/0306073 A1 Sep. 29, 2022

Related U.S. Application Data

(63) Continuation of application No. 16/563,457, filed on Sep. 6, 2019, now abandoned, which is a (Continued)

(51) Int. Cl.
*B60W 20/13* (2016.01)
*B60L 58/14* (2019.01)
(Continued)

(52) U.S. Cl.
CPC ............. *B60W 20/13* (2016.01); *B60L 58/14* (2019.02); *B60W 10/26* (2013.01); *B60W 20/12* (2016.01);
(Continued)

(58) Field of Classification Search
CPC ...... B60W 20/13; B60W 20/12; B60W 10/26; B60W 2510/244; B60W 2556/50; B60W 2710/083; B60W 2710/244; B60L 58/14;

B60L 2200/22; B60L 2240/622; F02N 11/06; F02N 15/006; F02N 2200/061; F02N 11/04; G01C 21/26; B60K 6/485; B60K 2006/268; B60Y 2200/23; H02P 2101/25; F02D 41/0027; F02D 41/065;
(Continued)

(56) References Cited

U.S. PATENT DOCUMENTS 5,751,137 A * 5/1998 Kiuchi .................. B60W 20/00
322/14
6,202,497 B1 3/2001 Kuragaki et al.
(Continued)

OTHER PUBLICATIONS

Thereby, Oct. 19, 2017, Oxford Learner's Dictionary, pp. 1-2.*

*Primary Examiner* — Andrew R Dyer
(74) *Attorney, Agent, or Firm* — Sandberg Phoenix & von Gontard, P.C.

(57) ABSTRACT

A method for remotely controlling the operation of a gas powered golf car, wherein the method comprises, via a global positioning system enhanced fleet management system (GPSEFMS) of the golf car communicatively connected with an internal combustion engine control unit (ECU) and a global position sensor of the golf car: monitoring a location of the golf car as the golf car is moving utilizing geospatial position data communicated from a global position sensor of the golf car to the GPSEFMS; determining when the golf car is one of near or within a geofenced area; and sending control commands to the ECU instructing the ECU to modify operation of the internal combustion engine, and hence operation of the golf car, in accordance with a predetermined operation profile specific to the geofenced area.

11 Claims, 10 Drawing Sheets

Related U.S. Application Data continuation-in-part of application No. 16/212,190, filed on Dec. 6, 2018, now Pat. No. 10,677,211.

(51) Int. Cl.

| | |
|---|---|
| *B60W 10/26* | (2006.01) |
| *B60W 20/12* | (2016.01) |
| *F02N 11/06* | (2006.01) |
| *G01C 21/26* | (2006.01) |

(52) U.S. Cl.
CPC .............. *F02N 11/06* (2013.01); *G01C 21/26* (2013.01); *B60L 2200/22* (2013.01); *B60L 2240/622* (2013.01); *B60W 2510/244* (2013.01)

(58) Field of Classification Search
CPC ......... F02D 2200/503; F02D 2200/701; F02D 31/009; H02K 7/006; H02J 7/1446
USPC ............................................................ 701/2
See application file for complete search history.

(56) References Cited

U.S. PATENT DOCUMENTS

| | | | |
|---|---|---|---|
| 7,239,032 B1 | 7/2007 | Wilson et al. | |
| 7,400,053 B2 | 7/2008 | Wilson et al. | |
| 9,102,205 B2 | 8/2015 | Kvien et al. | |
| 9,758,040 B1* | 9/2017 | Reid ..................... | B60K 28/00 |
| 9,828,965 B2* | 11/2017 | Ghoneim ............... | F02N 11/08 |
| 2002/0053838 A1 | 5/2002 | Okuda | |
| 2006/0038532 A1* | 2/2006 | Taniguchi ................ | B60L 1/00 |
| | | | 320/103 |
| 2007/0017466 A1 | 1/2007 | Leppanen et al. | |
| 2007/0215089 A1 | 9/2007 | Grand et al. | |

| | | | |
|---|---|---|---|
| 2007/0233339 A1* | 10/2007 | Wehrlen ............... | G05D 1/0278 |
| | | | 701/25 |
| 2008/0023240 A1 | 1/2008 | Sunsdahl et al. | |
| 2008/0173170 A1 | 7/2008 | Zauner et al. | |
| 2008/0246285 A1* | 10/2008 | Asada ................... | B60W 10/06 |
| | | | 290/40 C |
| 2009/0143188 A1 | 6/2009 | Soliman et al. | |
| 2009/0233757 A1 | 9/2009 | Soliman et al. | |
| 2009/0233758 A1 | 9/2009 | Soliman et al. | |
| 2009/0284087 A1 | 11/2009 | Takahashi et al. | |
| 2010/0041512 A1 | 2/2010 | Silveri et al. | |
| 2010/0094500 A1* | 4/2010 | Jin ......................... | G01C 21/26 |
| | | | 701/1 |
| 2012/0193163 A1 | 8/2012 | Wimpfheimer et al. | |
| 2013/0008401 A1 | 1/2013 | Lee et al. | |
| 2013/0252774 A1 | 9/2013 | Suntharalingam et al. | |
| 2014/0014064 A1 | 1/2014 | Kawasumi | |
| 2014/0214250 A1* | 7/2014 | Murakami .............. | B60L 53/55 |
| | | | 701/22 |
| 2015/0219056 A1 | 8/2015 | Boesch | |
| 2015/0226171 A1* | 8/2015 | Kees ..................... | B60W 10/26 |
| | | | 290/31 |
| 2016/0272191 A1* | 9/2016 | Atluri ................... | B60W 20/20 |
| 2016/0281597 A1 | 9/2016 | Kase et al. | |
| 2017/0136875 A1* | 5/2017 | Logan .................... | H04W 4/80 |
| 2017/0197622 A1* | 7/2017 | Books ...................... | B60K 6/20 |
| 2017/0268655 A1 | 9/2017 | Stocks et al. | |
| 2017/0297440 A1* | 10/2017 | Hu ........................... | H02M 3/04 |
| 2017/0335815 A1 | 11/2017 | Burrahm et al. | |
| 2018/0126978 A1 | 5/2018 | Jerger et al. | |
| 2018/0229712 A1 | 8/2018 | Shelton et al. | |
| 2018/0304747 A1 | 10/2018 | Vollmer | |
| 2018/0339703 A1* | 11/2018 | Nix ...................... | G05D 1/0282 |
| 2019/0023115 A1 | 1/2019 | Mackenzie et al. | |
| 2020/0256303 A1 | 8/2020 | Yohannes et al. | |
| 2020/0369278 A1 | 11/2020 | Mcbride et al. | |

* cited by examiner

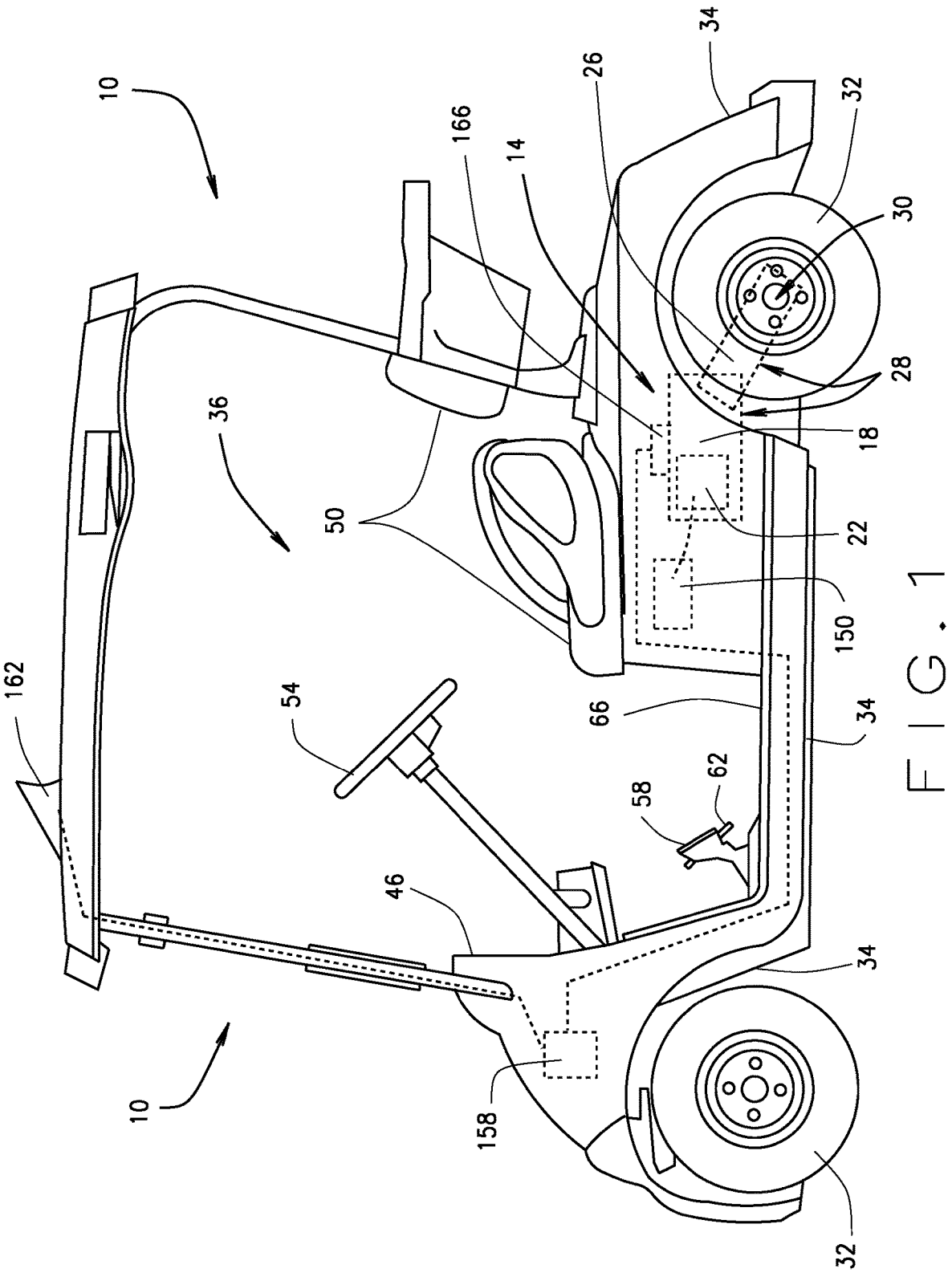
F I G . 1

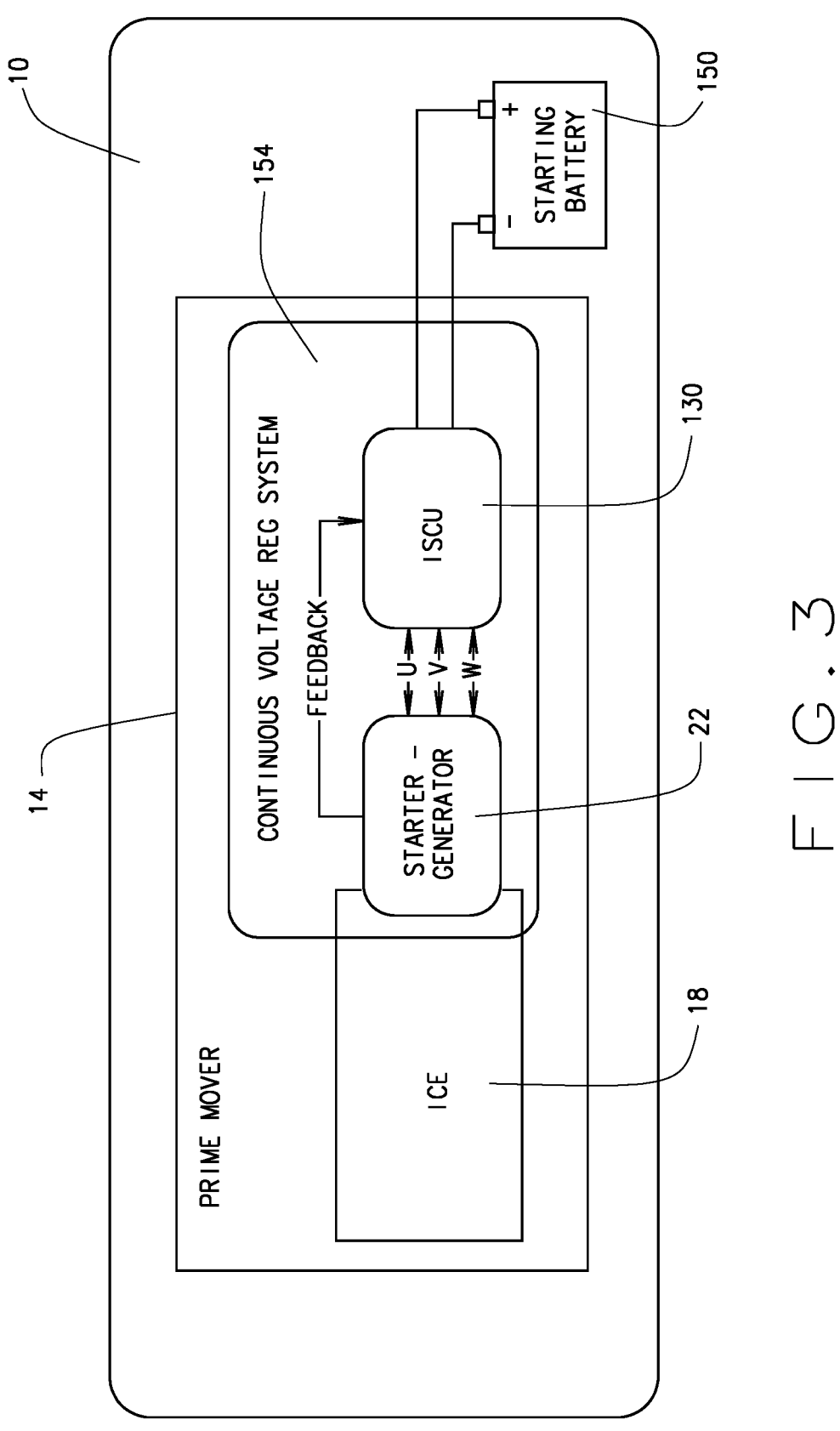
F I G . 3

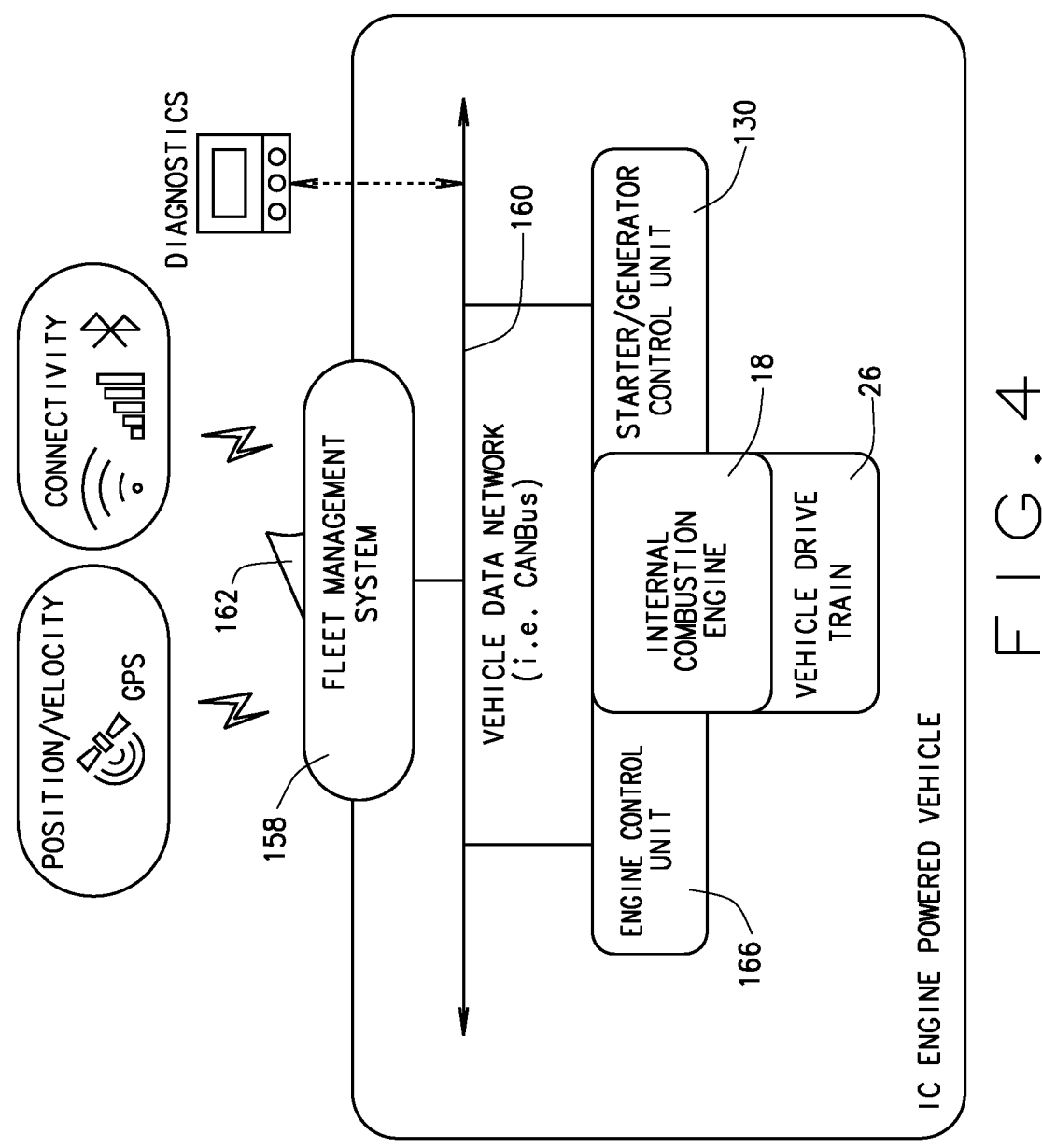
F I G . 4

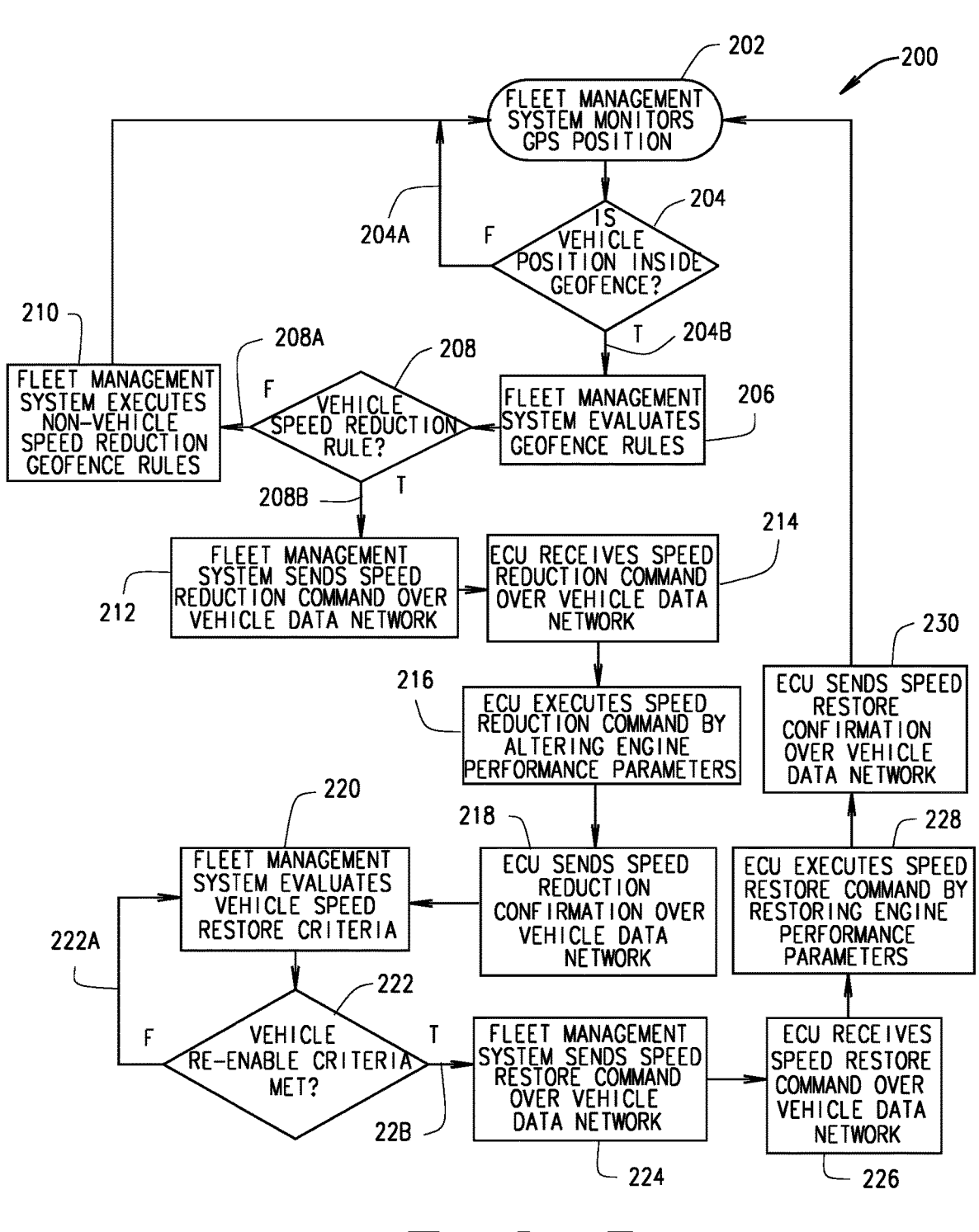
F I G . 5

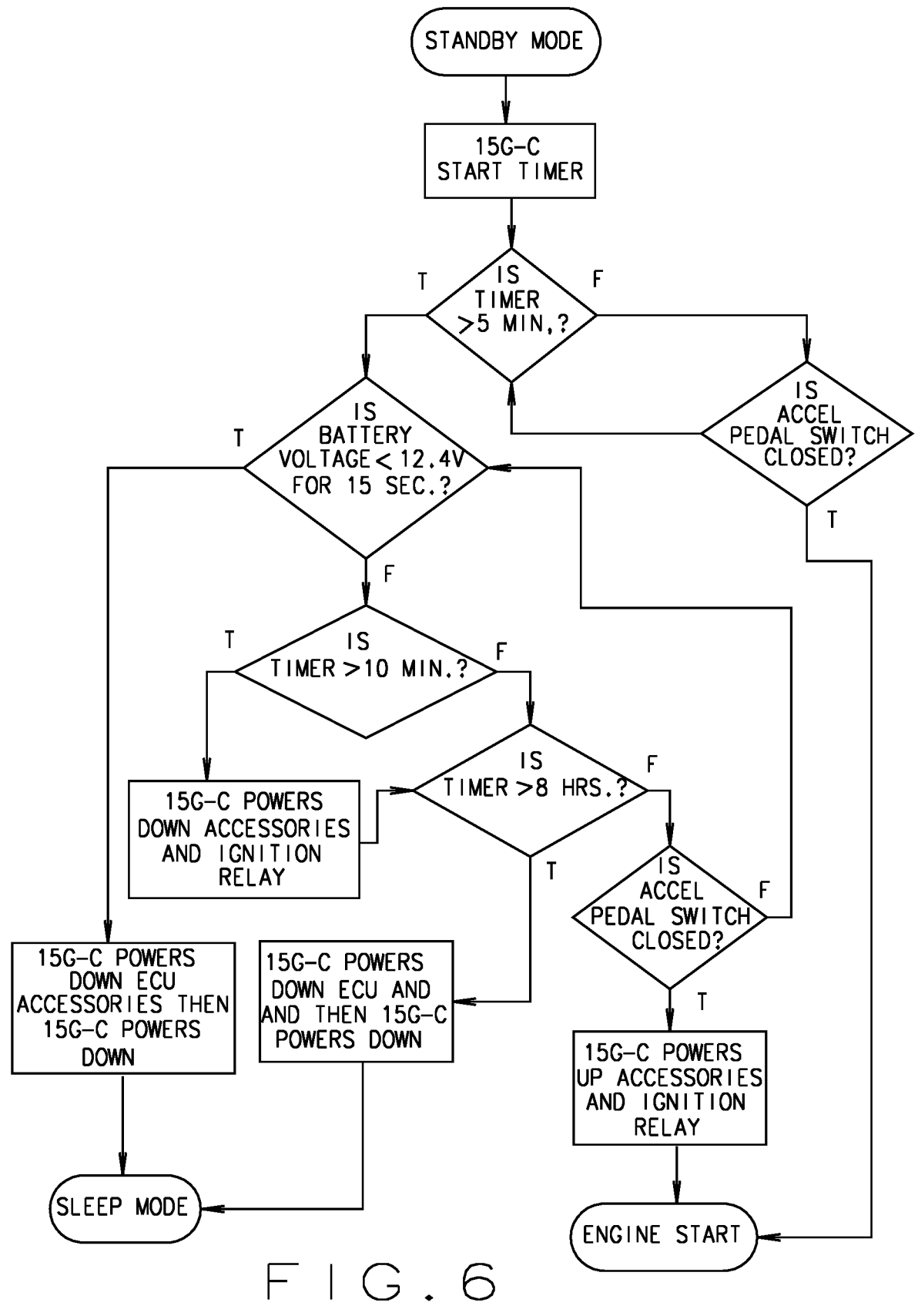
F I G . 6

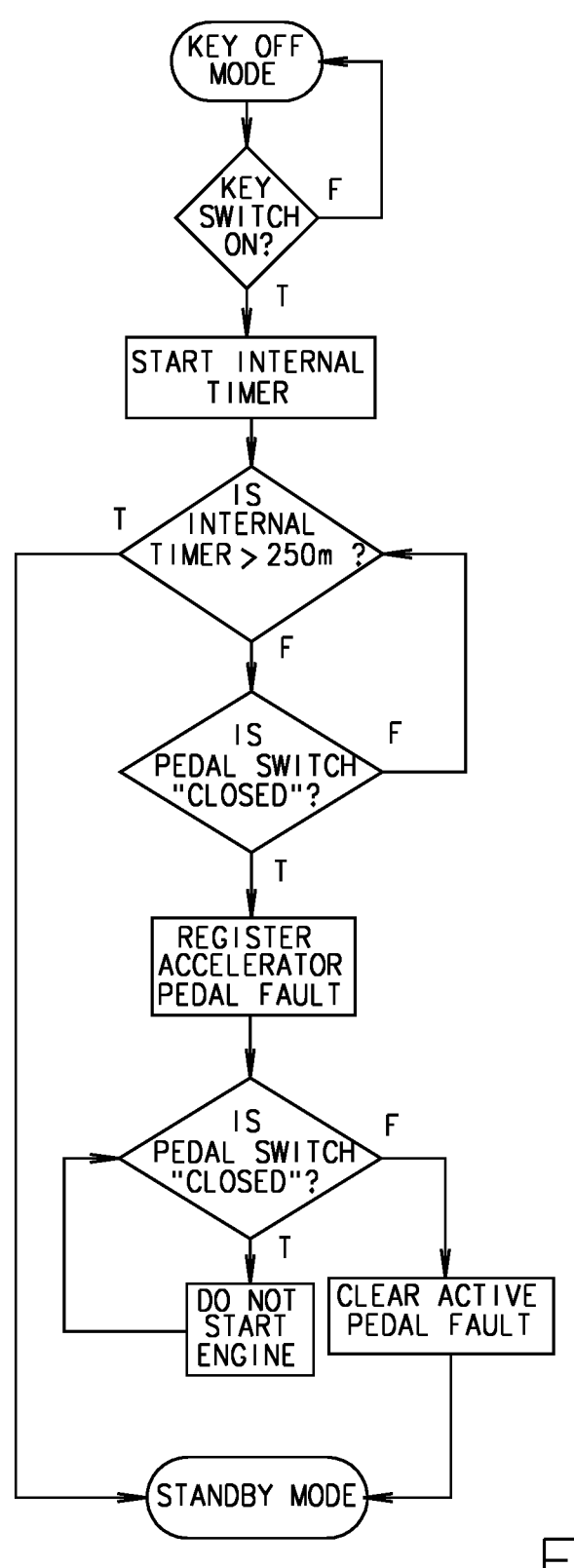
F I G . 7

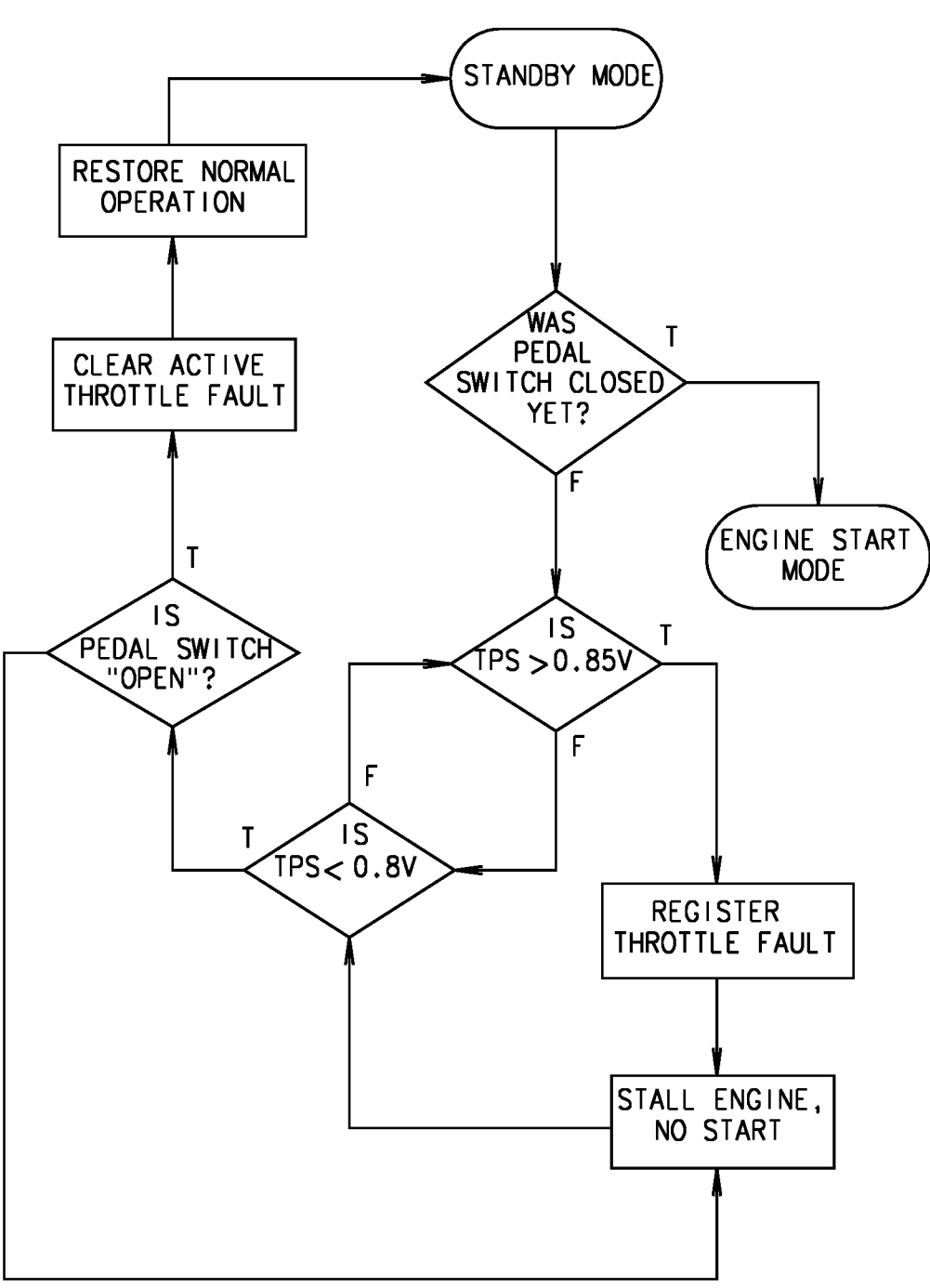
F I G . 8

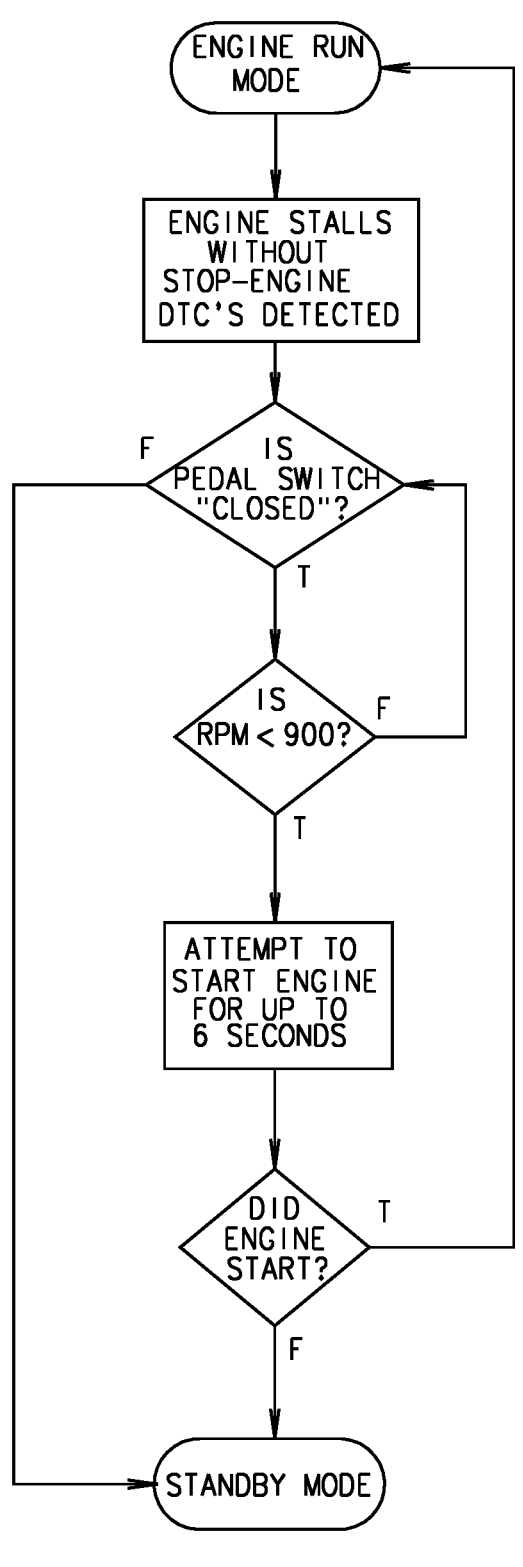
F I G . 1 0

GPS ENGINE CONTROL

CROSS-REFERENCE TO RELATED APPLICATIONS

This application is a continuation of U.S. patent application Ser. No. 16/563,457 filed on Sep. 6, 2019, which is a continuation-in-part of U.S. patent application Ser. No. 16/212,190 filed on Dec. 6, 2018. The disclosure of the above applications are incorporated herein by reference in their entirety.

FIELD

The present teachings relate to starters for engine in lightweight utility vehicles such as golf cars, and more particularly to: a starter-generator integrated with the respective engine to be started; power generation controls for optimally charging the vehicle's starting battery; and a GPS based speed control for vehicle management in the field.

BACKGROUND

The statements in this section merely provide background information related to the present disclosure and may not constitute prior art.

Traditionally, internal combustion (IC) engine golf and utility vehicles that utilize the accelerator pedal to start the vehicle IC engine use a starter motor (that in most instances is also a generator) that is mechanically coupled to the vehicle engine. Particularly, such typical vehicle IC engine starter systems comprise a DC starter motor/generator, and a drive belt and pulleys that mechanically couple the DC motor/generator to a flywheel of the vehicle IC engine. The flywheel is connected to a crankshaft of the vehicle IC engine. In such instances, the DC motor/generator is activated, via a pedal switch, to rotate the drive belt and pulleys, which in turn rotates the engine flywheel, which in turn rotates the engine crankshaft to start the vehicle engine. Hence, the traditional vehicle IC engine starter systems comprise a large number of components that in most instances have a finite service life and need frequent maintenance and repair. Additionally, the components of the traditional starter system can be a source to additional engine noise because of their design and applications.

Additionally, such pedal start vehicles are typically characterized by frequent engine starting. This high frequency of engine starting can lead to the state of charge of the battery used to provide electrical energy to state the engine (often referred to as the starting battery) to fall to an unacceptable level if the duration between each start does not allow enough time to replenish the energy that was removed from the prior engine starts. This can be compounded by any additional loading on the starting battery such as accessory loads. Furthermore, often times the initial state of charge of the starting batteries of vehicles that have been in a storage condition prior to use may not be at 100% due to quiescent current draws and battery stand losses while in storage.

The current state of the art in small IC engine powered vehicles is to employ a starter/generator system, as described above, for both starting the IC engine and generating power for battery charging and engine/accessory loads. Typically, for such pedal start applications, the battery is charged and maintained with a fixed, regulated voltage. To address the issues with pedal start applications vs maintaining a proper battery state of charge, the fixed, regulated voltage is sometimes set at a higher level to allow for quicker charging. This has the negative affect of decreasing battery life. Another method often employed to address the challenges of a pedal start application is to employ a starting battery with a very large reserve capacity. This prolongs the state of charge of the battery but at additional cost and does not prevent the issue but merely reduces the occurrence.

Furthermore, vehicles in fleet golf, industrial, or commercial applications typically have optional GPS-based fleet management systems (FMS) for remote vehicle monitoring and management. Often times such fleet management systems provide a geofencing feature as part of the fleet management system. The geofencing feature allows for designating specific geographical areas in which the respective vehicle is, or is not, permitted and for establishing certain rules to apply when vehicles enter an area where it is not allowed. One of the common rules for geofenced areas is disabling of vehicle motion as a deterrent from entering areas where the vehicle is not allowed. Generally, the current technique or method used for such vehicle disabling on IC engine powered vehicles is to interrupt an engine control signal by actuating a relay that physically interrupts an input to the IC engine. For example, interrupting a single from the vehicle ignition switch to the IC engine. Such engine disabling methods require the addition of mechanical or solid-state circuitry to accomplish the signal interruption. Such additional circuitry adds cost and complexity to the vehicle, and also introduces more failure points to the vehicle. Additionally, such IC engine disable systems are limited in operation to just an On state or an Off state, and can be easily defeated by bypassing the relay contacts.

SUMMARY

In various embodiments, the present disclosure provides a prime mover for a lightweight vehicle, wherein the prime mover is structured and operable to generate and deliver power to a driveline of the lightweight vehicle to provide motive force to the lightweight vehicle. In various embodiments, the prime mover comprises an internal combustion engine that is structured and operable to generate the power delivered to the driveline, a starter motor integrally integrated with the internal combustion engine, wherein the integrated starter motor is structured and operable to start the internal combustion engine, and a housing for the prime mover. In various instances the housing comprises an internal combustion engine portion that encloses at least a portion of the internal combustion engine, and a starter motor portion that encloses the integrated starter motor. In various embodiments, the starter motor portion of the housing comprises a shroud that is integrally formed with, or connected to, the internal combustion engine portion of the housing, and a cover connectable to the shroud to enclose the starter motor therebetween. In various implementations, the prime mover additionally comprises a Hall Effect sensor mounted to the combustion engine portion of the housing within the starter motor portion shroud, and a prime mover control module. The prime mover control module is structured and operable to communicate with the Hall Effect sensor, determine when operation of the internal combustion engine should start; and upon the determination that operation of the internal combustion engine should start, utilize the communication from the Hall Effect sensor to stop the internal combustion engine such that a piston of the internal combustion engine is positioned at between 15° and 25° after bottom-dead-center.

In various other embodiments, the present disclosure provides a lightweight vehicle, wherein the vehicle generally comprises a chassis, a passenger compartment supported by the chassis, a plurality of wheels, and a powertrain operatively connected to at least one of the wheels. In various instances the powertrain comprise a driveline that comprise an axle assembly operably connected to the at least one of the wheels, and a transaxle and/or a transmission operably connected to the axle assembly. The lightweight vehicle additionally comprises a prime mover operably connected to the driveline, wherein the prime mover is structured and operable to generate and deliver power to the driveline. The driveline is structured and operable to receive the generated power and deliver the power to the at least one wheel. In various instances the prime mover comprises an internal combustion engine that is structured and operable to generate the power delivered to the driveline, and a starter motor that is integrally integrated with the internal combustion engine, wherein the starter motor structured and operable to start the internal combustion engine.

In various other embodiments, the present disclosure provides a method of operating a prime mover for a lightweight vehicle, wherein the prime mover comprises a housing and a starter motor integrally integrated with an internal combustion engine that is disposed within the housing. The prime mover is structured and operable to generate and deliver power to a driveline of the lightweight vehicle to provide motive force to the lightweight vehicle. In various embodiments, the method comprises starting the internal combustion engine via the starter motor integrally integrated with the internal combustion engine, wherein a starter motor is enclosed within a starter motor portion of the housing, and the starter motor portion of the housing comprises a shroud and a cover connectable to the shroud to enclose the starter motor therebetween. In such embodiments the method additionally comprises generating and delivering power to the driveline via the internal combustion engine integrally integrated with the starter motor, wherein at least a portion of the internal combustion engine is enclosed within an internal combustion engine portion of the housing. In such embodiments, the method further comprises determining when operation of the internal combustion engine should start utilizing communications of an prime mover control module of the prime mover to with a Hall Effect sensor of the prime mover that is mounted to the housing, and upon the determination that operation of the internal combustion engine should start, stopping the internal combustion engine such that a piston of the internal combustion engine is positioned at between 15° and 25° after bottom-dead-center.

In various embodiments, the present disclosure provides a gas powered golf car, wherein the golf car comprises an internal combustion engine operably connected to a driveline, wherein the internal combustion engine is structured and operable to generate and deliver power to the driveline. The golf car additionally comprises a starter operably coupled with the internal combustion engine and structured and operable to start the internal combustion engine, a battery structured and operable to provide electrical energy to the starter for starting the internal combustion engine, and a generator operably connected the internal combustion engine, wherein the generator is structured and operable to generate voltage and output the voltage to the battery to charge the battery. Furthermore, the golf car comprises an integrated starter control unit communicatively connected to the generator. The integrated starter control unit is structured and operable to continuously monitor a state of charge of the battery, and based on the continuously monitored state of charge of the battery, to continuously control operation of the generator and thereby continuously control the voltage output by the generator to the battery in order to continuously maintain the state of charge of the battery within a desired range.

In various embodiments, the present disclosure provides a method for maintaining a state of charge of a battery in a gas powered golf car, wherein the method comprises operably coupling a starter of the golf car with an internal combustion engine of the golf car, wherein the starter is structured and operable to start the internal combustion engine; electrically connecting a battery with the starter, wherein the battery is structured and operable to provide electrical energy to the starter for starting the internal combustion engine; operably coupling a generator of the golf car with the internal combustion engine such that the internal combustion engine can drive the generator; electrically connecting the generator with the battery, wherein the generator is structured and operable to generate voltage and output the voltage to the battery to charge the battery; and communicatively connecting an integrated starter control unit with the generator. The method additionally comprises, via the integrated starter control unit, continuously monitoring a state of charge of the battery, and via the integrated starter control unit, continuously controlling operation of the generator based on the continuously monitored state of charge of the battery to thereby continuously control the voltage output by the generator to the battery to thereby continuously maintain the state of charge of the battery within a desired range.

In various embodiments, the present disclosure provides a method for remotely controlling the operation of a gas powered golf car, wherein the method comprises communicatively connecting a global positioning system enhanced fleet management system (GPSEFMS) of the golf car with an internal combustion engine control unit (ECU) of the golf car via a vehicle data network of the golf car, wherein the ECU structured and operable to control operation of an internal combustion engine of the golf car. The method additionally comprises, via the GPSEFMS, monitoring a location of the golf car as the golf car is moving utilizing geospatial position data communicated from a global position sensor of the golf car to the GPSEFMS, and via the GPSEFMS, determining when the golf car is one of near or within a geofenced area. The method further comprises, via the GPSEFMS, sending control commands to the ECU instructing the ECU to modify operation of the internal combustion engine, and hence operation of the golf car, in accordance with a predetermined operation profile specific to the geofenced area.

In various embodiments, the present disclosure provides a gas powered golf car, wherein the golf car comprises an operators seating area, operator controls, internal combustion engine operably connected to a driveline, wherein the internal combustion engine is structured and operable to generate and deliver power to the driveline. The golf car additionally comprises a starter operably coupled with the internal combustion engine and structured and operable to start the internal combustion engine, a battery structured and operable to provide electrical energy to the starter for starting the internal combustion engine and powering additional electrical loads on the golf car, a control module that is structured and operable to implement engine control command functionality, wherein the control module is structured to receive electrical communication from the operator controls. In various embodiments the control module receives communication based on operator control input to enact various operating modes wherein the control module is structured and operable to control access to the battery and operation of the engine.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

FIG. 1 is a side view of a lightweight vehicle including a prime mover comprising a starter motor integrally integrated with an internal combustion engine, in accordance with various embodiments of the present disclosure.

FIG. 3 is a block diagram of the vehicle including the prime mover comprising the starter motor integrally integrated with the internal combustion engine shown in FIG. 1, further comprising a continuous voltage regulation system, in accordance with various embodiments of the present disclosure.

FIG. 4 is a block diagram of the vehicle including the prime mover comprising the starter motor integrally integrated with the internal combustion engine shown in FIG. 1, further comprising a GPS enhanced fleet management system, in accordance with various embodiments of the present disclosure.

FIG. 5 is a flow chart exemplarily illustrating the operation of the GPS enhanced fleet management system shown in FIG. 4, in accordance with various embodiments of the present disclosure.

FIG. 6 is a flow chart exemplarily illustrating power management logic executable by a controller of the vehicle shown in FIG. 1 in accordance with various embodiments of the present disclosure.

FIG. 7 is a flow chart exemplarily illustrating power management logic executable by a controller of the vehicle shown in FIG. 1 in accordance with various other embodiments of the present disclosure.

FIG. 8 is a flow chart exemplarily illustrating power management logic executable by a controller of the vehicle shown in FIG. 1 in accordance with yet other various embodiments of the present disclosure.

FIG. 10 is a flow chart exemplarily illustrating power management logic executable by a controller of the vehicle shown in FIG. 1 in accordance with still yet other various embodiments of the present disclosure.

Corresponding reference numerals indicate corresponding parts throughout the several views of drawings.

DETAILED DESCRIPTION

Figure 2:
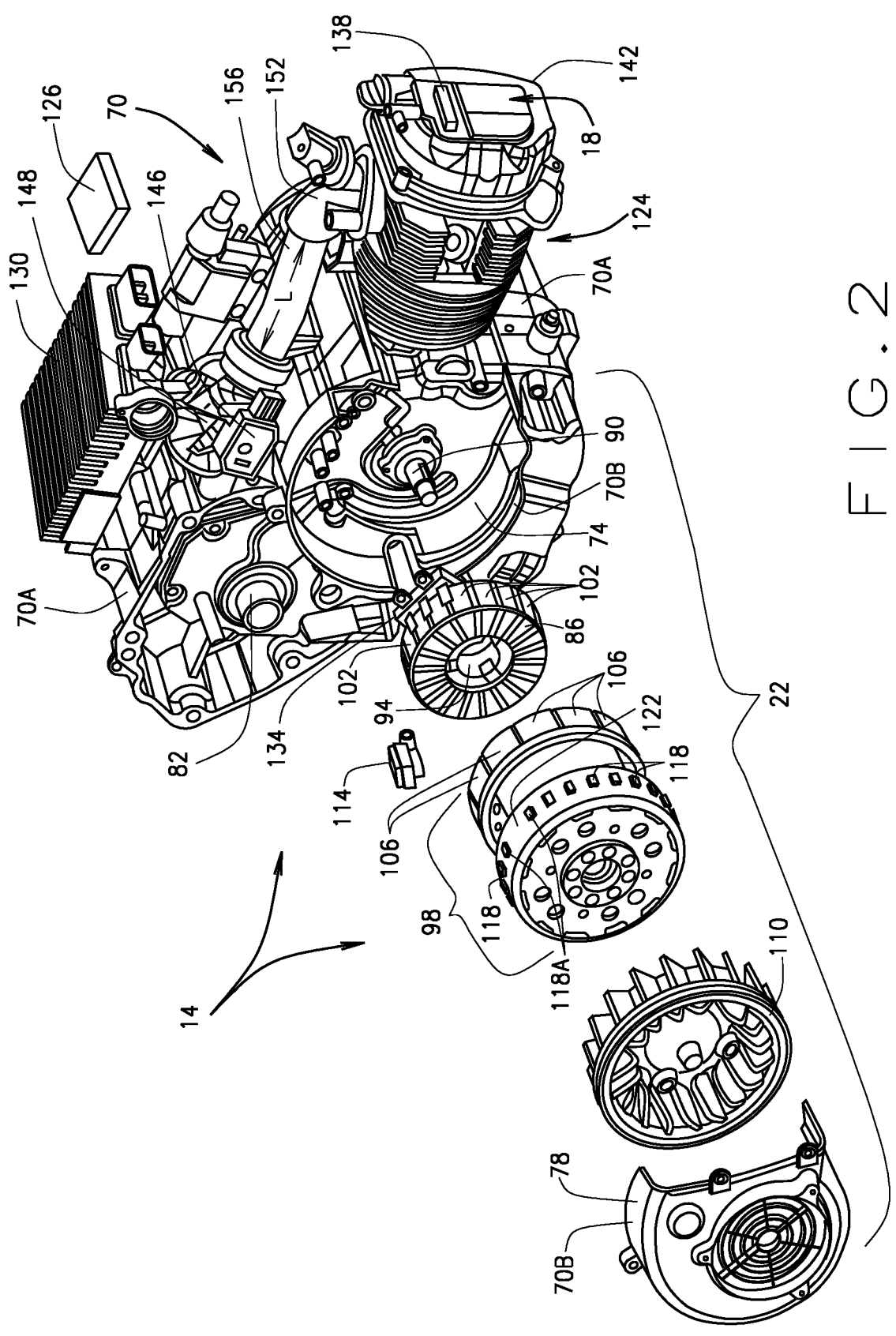
FIG. 2 is an exploded view of the prime mover of FIG. 1 comprising the starter motor integrally integrated with the internal combustion engine, in accordance with various embodiments of the present disclosure.
Figure 9:
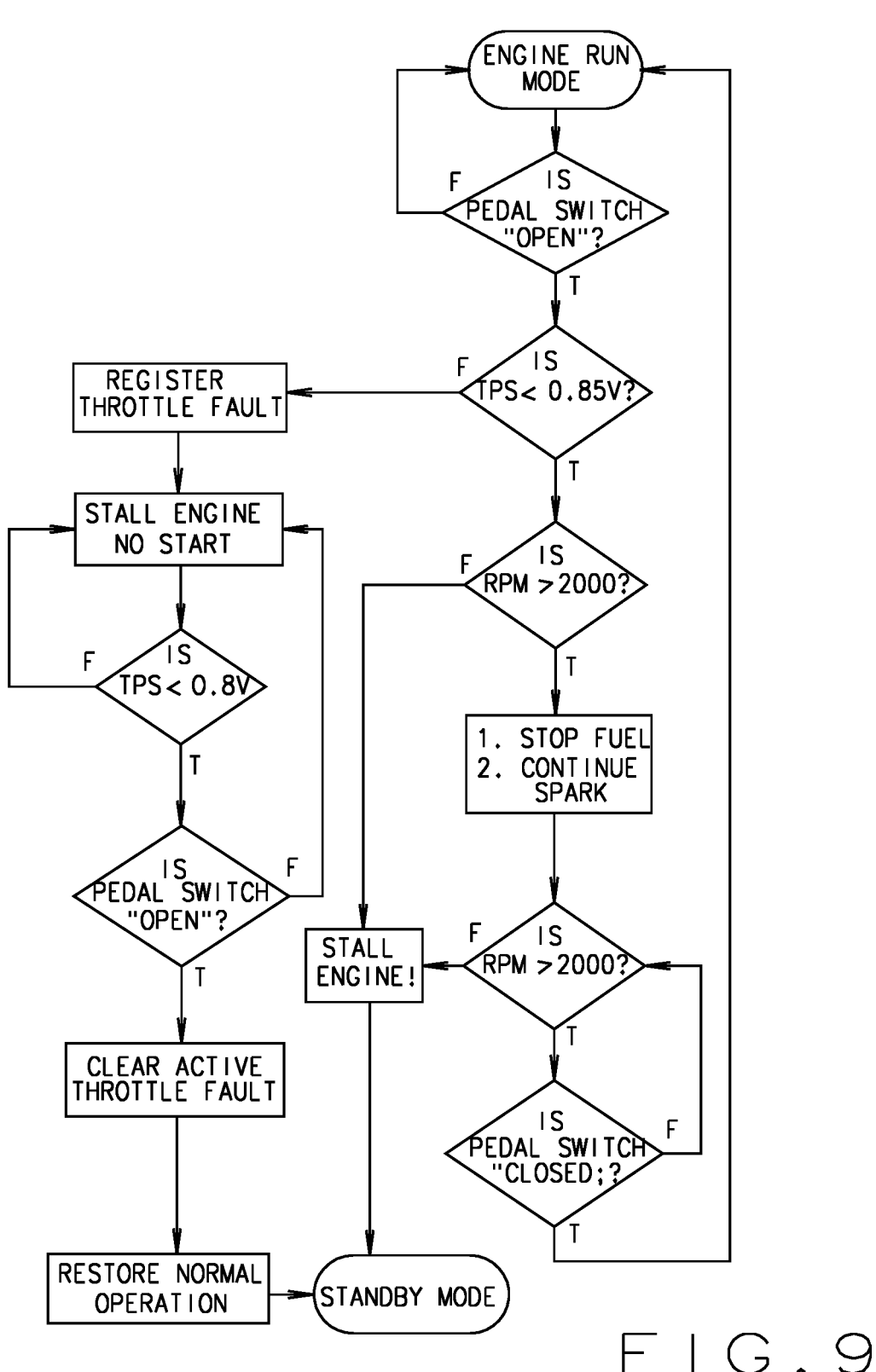
FIG. 9 is a flow chart exemplarily illustrating power management logic executable by a controller of the vehicle shown in FIG. 1 in accordance with still other various embodiments of the present disclosure.

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on," "engaged to or with," "connected to or with," or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on," "directly engaged to," "directly connected to," or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between," "adjacent" versus "directly adjacent," etc.).

As used herein the phrase "operably connected to" will be understood to mean two are more elements, objects, devices, apparatuses, components, etc., that are directly or indirectly connected to each other in an operational and/or cooperative manner such that operation or function of at least one of the elements, objects, devices, apparatuses, components, etc., imparts are causes operation or function of at least one other of the elements, objects, devices, apparatuses, components, etc. Such imparting or causing of operation or function can be unilateral or bilateral.

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

The prime mover and methods described herein can be controlled and implemented at least in part by one or more computer program products (e.g., a prime mover control module and/or an integrated starter control unit (ISCU), as described below) comprising one or more non-transitory, tangible, computer-readable mediums storing computer programs with instructions that may be performed by one or more processors. The computer programs may include processor executable instructions and/or instructions that may be translated or otherwise interpreted by a processor such that the processor may perform the instructions. The computer programs can also include stored data. Non-limiting examples of the non-transitory, tangible, computer readable medium are nonvolatile memory, magnetic storage, and optical storage.

As used herein, the term module can refer to, be part of, or include an application specific integrated circuit (ASIC); an electronic circuit; a combinational logic circuit; a field programmable gate array (FPGA); a processor (shared, dedicated, or group) that performs instructions included in code, including for example, execution of executable code instructions and/or interpretation/translation of uncompiled code; other suitable hardware components that provide the described functionality; or a combination of some or all of the above, such as in a system-on-chip. The term module can include memory (shared, dedicated, or group) that stores code executed by the processor.

The term code, as used herein, can include software, firmware, and/or microcode, and can refer to one or more programs, routines, functions, classes, and/or objects. The term shared, as used herein, means that some or all code from multiple modules can be executed using a single (shared) processor. In addition, some or all code from multiple modules can be stored by a single (shared) memory. The term group, as used above, means that some or all code from a single module can be executed using a group of processors. In addition, some or all code from a single module can be stored using a group of memories.

Referring now to FIG. 1, the present disclosure generally provides a lightweight vehicle 10, such as a golf car, that includes a prime mover 14 that comprises an internal combustion engine (ICE) 18 having a starter motor 22 integrally integrated therewith. In various instances, the starter motor 22 can comprise a starter-generator that is operable to start the ICE 18 and then, once the ICE 18 operating, generate electrical power/energy to power various electrical vehicle systems and accessories, and to charge the vehicle battery. In various embodiments, the prime mover 14 is operatively connected to a driveline 26, and the prime mover 14 combined with the driveline 26 comprise a powertrain 28 of the vehicle 10. The driveline 26 is structured and operable to receive power (e.g., torque) generated by the prime mover 14 (particularly by the ICE 18) and deliver the power to at least one of the wheels 32 to provide motive force to the vehicle 10. In various embodiments, the driveline 26 comprises a transaxle and an axle assembly 30. In such embodiments, the transaxle is operatively coupled to the prime mover 14 and the axle assembly 30, to which one or more of the wheels 32 is/are operatively connected. In various instances, the driveline 26 can comprise a transaxle having a mounting collar to which the prime mover 14 is mounted such as that described in co-pending patent application Ser. No. 16/135,406, filed Sep. 19, 2018 and titled Floating Engine Powertrain, the disclosure of which is incorporated herein by reference in its entirety. Alternatively, in various other embodiments, the driveline 26 can be a transmission (not shown, but readily understood by one skilled in the art) operatively connected to the prime mover 14 and operably connected to a differential (not shown, but readily understood by one skilled in the art) that is operatively connected to the axle assembly 30.

The powertrain 28 is structured and operable to deliver motive force to the vehicle 10. Specifically, the prime mover 14 (e.g., the ICE 18) is structured and operable to generate and deliver power (e.g., torque) to the driveline 26, thereby delivering the power/torque to the axle assembly 30. The axle assembly 30 in turn delivers the power/torque generated by the prime mover 14 to at least one wheel 32 operably connected to the axle assembly 30 (referred to herein as driven wheel(s) 32), thereby delivering motive force to the vehicle 10. In addition to the driven wheel(s) 32, the vehicle 10 can include one or more non-driven wheels 32 that is/are operationally connected to a chassis 34 or other frame structure of the vehicle 10, and/or one or more non-driven wheels 32 operationally connected to the axle assembly 30.

Although the vehicle 10 is exemplarily illustrated as a golf car throughout the various figures, it should be understood that in various embodiments, the vehicle 10 can be a maintenance vehicle, a cargo vehicle, a shuttle vehicle, an all-terrain vehicle (ATV), a utility-terrain vehicle (UTV), a worksite vehicle, a buggy, any lightweight vehicle, or any other suitable type of utility or low-speed vehicle that is not designated for use on roadways, and remain within the scope of the present disclosure.

The vehicle 10 additionally comprises a passenger compartment 36 that is mounted to and supported by the chassis 34. The passenger compartment 36 generally includes: a dash/instrument console 46 that can include such things a vehicle On/Off key switch for controlling the operation mode of the vehicle 10, a forward/neutral/reverse selector, one or more small accessory storage pockets, a speedometer, various other gauges and/or instrumentation, a radio, and/or various other vehicle controls; a seating structure 50 structured and operable to provide seating for one or more vehicle occupants; a steering wheel 54 for use by the vehicle operator to control the directional movement of the vehicle 10; a brake pedal 58 for use by the vehicle operator to control slowing and stopping of the vehicle 10; an accelerator pedal 62 for use by the vehicle operator to start the prime mover 14 (e.g., to start the ICE 18) and control the torque/power delivered by the prime mover 14 to one or more of the wheels 32; and a floorboard 66.

Additionally, although the powertrain 28 of the present disclosure will, by way of example, be shown and described herein as structured and operable to deliver motive force to the rear wheel(s) 32, via the axle assembly 30 (shown by way of example as a rear axle assembly), it should be understood that, in various embodiments, the powertrain 28 of the present disclosure can be structured and operable to deliver motive force to the front wheel(s) 32, via a front axle assembly (not shown, but readily understood by one skilled in the art), and remain within the scope of the present disclosure. In yet other embodiments, it is envisioned that powertrain 28, as described herein can be implemented in a four-wheel drive vehicle including a power take off assembly (not shown, but readily understood by one skilled in the art) operable to deliver motive force (i.e., power/torque) generated by the prime mover 14 to one or more of the front wheel(s) 32 and/or rear wheel(s) 32.

Referring now to FIGS. 1 and 2, as described above, the prime mover 14 comprises the integrated starter motor 22 (in various embodiments the starter-generator 22) that is integrally integrated with the combustion engine 18. In operation, the integrated starter motor 22 (in various embodiments the starter-generator 22) is structured and operable to start the internal combustion engine 18, and the internal combustion engine 18 is structured and operable to generate the power delivered to the driveline 26, thereby providing motive force to the vehicle 10. In various embodiments, the prime mover 14 comprises a housing 70 that includes an internal combustion engine portion 70A that encloses at least a portion of the internal combustion engine 18, and a starter motor portion 70B that encloses the integrated starter motor 22 (in various embodiments the starter-generator 22). In various implementations, the starter motor portion 70B comprises a shroud 74 that is either integrally formed with, or connected to, the internal combustion engine portion 70A, and a cover 78 that is connectable to the shroud 74 to define the housing starter motor portion 70B. The cover 78 can be connected or mounted to the shroud 74 using any suitable connector or fastener, such as bolts, screws, glue, clamps, welding, etc.

The internal combustion engine 18 can be any small engine suitable for generating and delivering sufficient power to the vehicle driveline 26 to provide a desired range of motive force to the vehicle 10. For example, in various embodiments the internal combustion engine 18 can comprise one or more cylinders having a displacement volume of 100 to 500 cubic centimeters (CC). Particularly, in various instances, the internal combustion engine 18 can be a single cylinder engine having a displacement volume of 100 to 250

CC, e.g., 150 CC. The internal combustion engine 18 comprises an output shaft 82 that is connectable to the driveline 26. In operation, when the output shaft 82 is coupled to the driveline 26, the internal combustion engine 18 generates the power/torque that is output to the driveline 26 by the output shaft 82. As described above, the driveline 26 can be configured in any desired manner including any desired combination and configuration of common driveline components, such as a transaxle and/or a transmission, and/or a differential, and/or one or more drive shafts, etc. The output shaft 82 can be coupled to any desired component of the driveline 26 depending on the respective driveline configuration. For example, in various embodiments, the internal combustion engine output shaft 82 can be directly coupled to and input shaft of a transaxle as described in co-pending patent application Ser. No. 16/135,406, filed Sep. 19, 2018 and titled Floating Engine Powertrain, the disclosure of which is incorporated herein by reference in its entirety.

In various embodiments, the integrated starter motor 22 (in various embodiments the starter-generator 22) comprises a stator 86 mounted to the combustion engine portion 70A of the housing 70 within the shroud 74 of starter motor portion 70B of the housing 70. More specifically, the stator 86 has an annular shape and is mounted to the combustion engine portion 70A such that a crankshaft 90 of the internal combustion engine 18 extends through a center aperture 94 of the stator 86. The integrated starter motor 22 (in various embodiments the starter-generator 22) additionally comprises a rotor 98 that is mounted to the crankshaft 90 over and around the stator 94 such that stator 94 is disposed within an interior space of the rotor 98. The rotor 98 is mounted to the crankshaft 90 such that rotation of the rotor 98 will rotate or turn the crankshaft 90, and rotation of the crankshaft 90 will rotate or turn the rotor 98. The stator 86 comprises a plurality of field coils 102 that can be energized by electrical energy provided by a battery source of the vehicle (not shown, but readily understood by one skilled in the art). The rotor 98 comprises a plurality of permanent magnets 106 mounted to and disposed around a cylindrical sidewall of the rotor 98. Hence, the rotor 98 is mounted to the crankshaft 90 such that the rotor 98 is disposed around and/or over the stator 86. Therefore, the permanent magnets 106 of the rotor 98 are disposed radially outward from, adjacent and in close proximity to the field coils 102 of the stator 86.

Accordingly, when a vehicle operator causes electrical current to flow through the stator field coils 102 (e.g., by depressing the accelerator pedal 62), the field coils 102 will be energized and generate a magnetic flux field that repulses and/or attracts the rotor permanent magnets 106, thereby causing the rotor 98 to rotate about the stator 94. Moreover, the rotation or turning of the rotor 98 will cause the crankshaft 90 to turn or rotate, and thereby start the internal combustion engine 18. In various embodiments, the integrated starter motor 22 (in various embodiments the starter-generator 22) additionally includes a fan 110 mounted to the rotor 98 such that rotation of the rotor 98 will operate the fan 110 to cool the integrated starter motor 22 (in various embodiments the starter-generator 22).

In various embodiments, the integrated starter motor 22 (in various embodiments the starter-generator 22) further comprises a variable reluctance (VR) sensor 114, that in various instances can be mounted to the combustion engine portion 70A of the housing 70 within the starter motor portion shroud 74. Additionally, in such embodiments, a plurality of crankshaft alignment teeth 118 can be disposed on and around the outer surface of the cylindrical sidewall of the rotor 98. The teeth 118 are disposed on, or integrally formed, around the outer surface such that all the teeth 118 are evenly spaced apart except for one set of adjacent teeth 118A that are further spaced apart than all the other adjacent teeth 118 (e.g., one tooth is has been removed), such that an alignment gap 122 is provided between the one set of teeth 118A. Importantly, the rotor 98 is mounted to the crankshaft 90 such that when the rotor 98 is stopped (i.e., operation of the internal combustion engine 18 is ceased) the alignment gap 122 is positioned, oriented or aligned in a particular relation with the VR sensor 114 (e.g., when a center of the alignment gap 122 is aligned with a center of the Hall Effect sensor). Particularly, when the alignment gap 122 is positioned, oriented or aligned in the particular relation with the VR sensor 114, one or more piston(s) 124 of the internal combustion engine 18 will be at a Home position within the stroke of the respective piston(s). For example, in various instances, when the rotor 98 is stopped (i.e., operation of the internal combustion engine 18 is ceased) and the center of the alignment gap 122 is aligned with a center of the Hall Effect sensor, the one or more piston(s) will be at the Home position, which is approximately 5° to 35° (e.g., approximately 15° to 25°, e.g., approximately 20°) after bottom-dead-center. Furthermore, the VR sensor 114 is disposed in alignment and proximity to the teeth 118 such that the VR sensor 114 can sense the teeth 118 as the rotor 98 turns, and more particularly, can sense the location of the alignment gap 122. For example, the teeth 118 can generate magnetic pulses sensed by the VR sensor 114 as the rotor 98, and hence the crankshaft 90, turns. One skilled in the art will readily recognize the internal combustion engine piston(s) is/are connected to the crankshaft 90 such that rotation of the crankshaft will operate the piston(s), and operation of the piston(s) will rotate the crankshaft 90.

In such embodiments, the prime mover 14 includes an electronic prime mover control module (PMCM) 126 that is a computer based module. It is envisioned that the PMCM 126 can be a hardware based module that is structured and operable to implement prime mover control command functionality as described herein. It should be understood that, although the various prime mover control operations and functionality may be described herein as being implemented or carried out by PMCM 126, it will be appreciated that in some embodiments the PMCM 126 may indirectly perform and/or control performance of such operations and functionality by generating commands and control signals that can cause other elements to carry out the control operations and functionality described herein. For example, in the various executable software embodiments, it is the execution of the prime mover control command software by one or more processors of the PMCM 126 that can generate the prime mover control commands that are then output by the PMCM 126 to control the operations and functions of the prime mover 14 as described herein. Or, in the various hardware embodiments, it is the operation of the various PMCM 126 hardware components that can generate the prime mover control commands that are then output by the PMCM 126 to control the operations and functions of the prime mover 14 as described herein.

The PMCM 126 communicates with and controls the operation of various instruments, components, and systems of the vehicle 10. For example, the PMCM 126 can communicate with an integrated starter control unit (ISCU) 130 that is structured and operable to control operation of the integrated starter motor 22 (in various embodiments starter-generator 22). The PMCM 126 can additionally communicate with the Hall Effect sensor 114, and/or a current flow control unit (not shown, but readily understood by one skilled in the art) that is operable to control the flow of electrical current to the stator field coils 102. As described further below, by controlling the operation of the current flow control unit, the PMCM 126 can control energizing of the stator field coils 102 to control the position, orientation or alignment of the alignment gap 122 with the VR sensor 114 in order to control rotational position of the crankshaft 90, and more particularly the positioning, or power phase, of one or more piston 124 of the internal combustion engine 18.

The PMCM 126 is structured and operable to communicate with various sensors, components, and systems of the internal combustion engine 18 and control various operations of the internal combustion engine 18. For example, in various instances the ISCU 130 is operable to communicate with a throttle body sensor 146 of the internal combustion engine 18. The throttle body sensor 146 is operable to measure barometric pressure within a throttle body 148, and/or within an engine manifold 152, and/or within a throttle body hose 156 fluidly connecting the throttle body 146 with the manifold 152 of the internal combustion engine 18. In various instances, the throttle body sensor 146 can be structured and operable to communicate with the PMCM 126 to determine whether the piston(s) of the internal combustion engine 18 (e.g., the single piston in the exemplary single piston ICE 18 embodiments) is/are in a power or exhaust stroke (i.e., determine the power phase of the piston(s)). In various embodiments, the PMCM 126 is additionally operable to communicate with the accelerator pedal 62 and/or brake pedal 58 and/or the ISCU 130. Moreover, via the communication with the ISCU 130, and/or the accelerator pedal 62 and/or brake pedal 58, the PMCM 126 can determine when a vehicle operator desires to cease operation of the internal combustion engine 18, e.g., the operator wishes to stop movement of the vehicle 10.

Additionally, in various embodiments, the prime mover 14 comprises a Hall Effect sensor 134 mounted to the stator 86. The Hall Effect sensor 134 communicates with the ISCU 130 and/or the PMCM 126, and is operable to measure the magnetic reluctance, or magnetic pulses, of the rotor magnets 106. By monitoring the magnetic reluctance, or magnetic pulses, of the rotor magnets 106, the ISCU 130 and/or the PMCM 126 can determine the rotational position of the rotor 98, and thereby monitor the position (or power phase) of the internal combustion engine piston(s) (e.g., the single piston in the exemplary single piston ICE 18 embodiments). Hence, in various embodiments, via communication with the accelerator pedal 62 and/or the brake pedal 58 and/or the ISCU 130, the PMCM 126 can determine when it is desired that operation of the internal combustion engine 18 be ceased. Then, upon determination that it is desired that operation of the internal combustion engine 18 cease, the PMCM 126 can utilize the communication with the VR sensor 114, and/or the ISCU 130, the throttle body sensor 146, and/or the Hall Effect sensor 134 to control the operation of the current flow control unit to control the energizing of the stator field coils 102. By controlling the current flow to the stator field coils 102, the PMCM 126 can control the rotation of the rotor 98 and crankshaft 90 to align the alignment gap 122 with the Hall Effect sensor 134, and/or (via the VR sensor 114) adjust the barometric pressure within the throttle body 148, and/or within the engine manifold 152, and/or within the throttle body hose 156 of the internal combustion engine 18 such that the piston(s) (e.g., the single piston in the exemplary single piston ICE 18 embodiments) of the internal combustion engine 18 will be stopped at the Home position (i.e. at between 5° and 35° after bottom-dead-center, e.g., between 15° and 25° after bottom-dead-center, e.g., approximately 20° after bottom-dead-center). By positioning the internal combustion engine piston(s) (e.g., the single piston in the exemplary single piston ICE 18 embodiments) at the Home position when the operation of the internal combustion engine is turned Off (e.g., cease operation), the compression within the piston cylinder(s) (e.g., the single piston in the exemplary single piston ICE 18 embodiments) will provide resistance to movement of the vehicle 10 once the brake 58 is disengaged and the integrated starter 22 (in various embodiments the starter-generator 22) is operated to start the internal combustion engine 18.

As described above, in various embodiments, the ICE 18 can comprise the throttle body hose 156 that fluidly connects the throttle body 146 with the manifold 152 of the internal combustion engine 18. Particularly, in various embodiments, the throttle body hose 156 can fluidly connect the throttle body 148 with the manifold 152 such that the throttle body 148 is a distance away from the manifold 152. More particularly, in various instances, the throttle body hose 156 can have a length L such that the throttle body 148 is located on the engine 18 rearward (e.g., the direction from the valve cover 142 toward the engine output shaft 82) of the manifold 152. For example, in various instances the throttle body hose 156 can have a length L such that the throttle body 148 is a greater distance away from, or rearward of the manifold 152 than the crankshaft 90. Locating the throttle body 148 rearward of the manifold 152 allows for reduction the maximum horse power of the ICE 18, and more particularly allows the power curve of the ICE 18 to be shifted to a lower RPM (revolutions-per-minute) at which the maximum horse power of the ICE is available.

In various embodiments, the ISCU 130 can be configured and operable to implement a power management function or logic (e.g., algorithm or software), wherein the ISCU 130 communicates with the vehicle On/Off key switch and provides the vehicle On/Off key switch setting input to the PMCM 126, which enables the ISCU 130 to power down the PMCM 126 based on time and/or vehicle key switch state/position. An additional feature added to the ISCU 130 is an accessory relay driver wherein the ISCU 130 is operable to power down electrical vehicle accessories as part of the overall power management scheme of the vehicle 10.

In accordance with various embodiments, an exemplary flow chart 300 of the power management logic is exemplarily illustrated in FIG. 6. A control module (e.g., ISCU 130, ECU 166, or combination of modules) enters a standby mode in response from the On/Off key switch 42 providing an ON setting to the control module and simultaneously begins a standby timer that represents time elapsed from the moment the ON setting has been provided by the On/Off key switch 42. In some embodiments the timer resets when the On/Off key switch 42 is cycled from the ON position to the OFF position and then back ON. Upon entering standby mode, the control module closes an accessory relay and an ignition relay, wherein closing the accessory relay allows power to be delivered to vehicle accessories (e.g. lights, radio, operator monitors) and closing the ignition relay connects the control module to the battery, giving the control module access to high amperage power (e.g. greater than 20 amps) and ability to start the ICE 18 upon a normal engine starting user input (e.g., closing a pedal switch operably connected to the accelerator pedal 62). In response to the standby timer reaching a first time threshold (e.g., between 0 and 20 min, between 1 and 10 minutes, 5 minutes) and/or a low battery voltage signal (e.g. below 12.4 volts), the control module opens the accessory relay, opens the ignition relay, and powers down any other modules (e.g., ISCU 130 controller powers down ECU 166). In some embodiments this puts the control module into a sleep mode (e.g., low power mode, powered down mode) wherein a wakeup event (e.g., cycling the On/Off key switch 42 to OFF position then ON again) is required to enter standby mode.

In some embodiments the control module monitors the standby timer for a second threshold (e.g., between 10-30 minutes, 10 minutes) when the timer exceeds the first threshold and there is no low battery signal, wherein the second threshold is greater than the first. When the second time threshold is exceeded by the timer, the control module opens the accessory relay and the ignition relay. During this period the control module is still awake and available to close the ignition and accessory relays upon receiving an engine start command from the user (e.g., activation of the pedal switch) and then send starting current to the starter 22.

In some embodiments the control module monitors the standby timer for a third threshold (e.g., 8-24 hours, 8 hours) when the timer exceeds the first threshold and there is no low battery signal, wherein the third threshold is greater than the first and second. When the third time threshold is exceeded by the timer, the control module opens the accessory relay and the ignition relay and powers down any other modules (e.g., ISCU 130 controller powers down ECU 166). In some embodiments this puts the control module into a sleep mode (e.g., low power mode, powered down mode) wherein a wakeup event (e.g., cycling the On/Off key switch 42 to OFF position then ON again) is required to enter standby mode.

In various embodiments, the prime mover 14 further comprises one or more decompression mechanism 138 that is/are mounted to the internal combustion engine 18 and is/are in fluid communication with the piston cylinders of the internal combustion engine 18. More specifically, in various instances the decompression mechanism(s) 138 is/are mounted inside one or more valve cover 142 of the internal combustion engine 18 and can be part of an overhead cam system (not shown, but readily understood by one skilled in the art) of the internal combustion engine 18. The decompression mechanism 138 is a mechanical system and is structured and operable to open one or more intake valve (not shown, but readily understood by one skilled in the art) of the internal combustion engine 18 during initial rotation of the internal combustion engine crankshaft 90 by the starter motor 22 (in various embodiments the starter-generator 22) such that compression cannot occur within a piston cylinder of the internal combustion engine 18 during rotation of the crankshaft 90 by the starter motor 22 (in various embodiments the starter-generator 22) to start the internal combustion engine 18. Particularly, the decompression mechanism(s) 138 hold(s) the exhaust valve (not shown, but readily understood by one skilled in the art) of the piston cylinder(s) open until a cam shaft (not shown, but readily understood by one skilled in the art) of the internal combustion engine spins at a desired RPM (e.g., 600-1500 RPM, e.g., 900-1000 RPM), after which the decompression mechanism(s) 138 allow(s) the exhaust valves to close and create compression within the piston cylinder(s).

As described above, in various embodiments, the integrated starter motor 22 can be a starter-generator structured and operable to function as an electrical generator once the internal combustion engine 18 has been started by the integrated starter-generator 22. Particularly, once the internal combustion engine 18 has been started and is operating, the motive forced (e.g., power and/or torque) generated by the operating internal combustion engine 18 will turn the crankshaft 90, which in turn will rotate the rotor 98. As is readily understood by one skilled in the art, rotation of the rotor 98 about the stator 94, when current is not being applied to the stator field coils 102, will induce current in the stator filed coils 102, thereby generating electrical power that can be used to operate one or more electrical systems, apparatuses, devices and/or components of the vehicle 10 and to charge the battery during operation of the vehicle 10.

It is also envisioned that in various embodiments, the rotor 98 can function as a fly wheel to balance the forces generated by and action on the internal combustion engine 18. For example, on a power stroke side of movement of the piston(s) 124, the internal combustion engine 18 can generate forces that act on the internal combustion engine 18. However, on an exhaust stroke side of movement of the piston(s) 124, the internal combustion engine 18 will not generated such forces. In such instances, the rotor 98 will act as fly wheel that generates inertia forces that will balance the power stroke forces.

The integrated starter motor 22, e.g., the starter-generator 22, can be any type of suitable motor/generator that is integrally integrated with the internal combustion engine 18, and remain within the scope of the present disclosure. For example, in various embodiments the integrated starter motor-generator 22 can be 3-phase brushless (e.g., non-contact) and/or bearingless motor.

Referring now to FIGS. 1 and 3, as described above, vehicles such as vehicle 10, e.g., golf cars, that employ pedal start systems are characterized by frequent engine starting, which can lead to the state of charge (SOC) of one or more vehicle battery 150 (e.g., the starting battery(ies)) to fall to an unacceptable level if the duration between each start does not allow enough time to replenish the energy that was used/removed from the prior engine starts. As also described above, in various embodiments, operation of the integrated starter motor 22, e.g., the integrated starter-generator 22, is controlled by the ISCU 130. In various embodiments, the integrated starter-generator 22 together with the ISCU 130 comprise a continuous voltage regulation system 154. As further described above, in various instances, the starter-generator 22 can be a 3-phase brushless DC motor. Although, in various instances, the starter-generator 22 can comprise other motors such as a synchronous AC motor or an AC induction motor, the starter-generator 22 will be exemplarily described and illustrated with reference to FIG. 3 as a 3-phase brushless DC motor.

As exemplarily illustrated in FIG. 3, the ISCU 130 is communicatively connected to the integrated starter-generator 22. The ISCU 130 is a computer based module that is operable to bi-directionally communicate with the starter-generator 22. More specifically, the ISCU 130 comprises at least one processor operable to execute one or more starter-generator control program or algorithm in order to send commands to the starter-generator 22 and receive various data and/or information from the starter-generator 22 (i.e., feedback), and thereby control operation of the starter-generator 22. More particularly, the continuous voltage regulation system 154 is a closed-loop system wherein the ISCU 130, via execution of the starter-generator control program(s)/algorithm(s), continuously monitors the SOC of the battery(ies) 150 and can utilize feedback from the starter-generator 22 to generate control commands that are sent to the starter-generator 22 to control operation of the starter-generator 22 in accordance with one or more battery charge profile within, or accessible by, the starter-generator control program(s)/algorithm(s). For example in various embodiments, the starter-generator control program(s)/algorithm(s) can comprise one or more variable voltage program/algorithm that continuously monitor(s) the SOC of the battery(ies) 150 in real time (via one or more battery voltage sensor that can be internal and/or external to the ISCU 130) and controls operation of the starter-generator 22 to thereby continuously regulate (e.g., adjust) the voltage output level of starter-generator 22 using the real time SOC data for the battery(ies) 150 and, in various instances, feedback from the starter-generator 22.

More specifically, via execution of the variable voltage program(s)/algorithm(s), the continuous voltage regulation system 154 is operable to continuously regulate (e.g., adjust) the voltage output level of starter-generator 22 using real time SOC data for the battery(ies) 150 while the vehicle 10 is in operation (e.g., while the ICE 18 is running, e.g., while the golf car 10 is being utilized/driven on a golf course). More particularly, the continuous voltage regulation system 154 is operable to continuously regulate the voltage output level of starter-generator 22 to maintain the battery(ies) SOC within a desired range during use of the vehicle 10. Therefore, the SOC of the battery(ies) 150 will not fall below a desired minimum (e.g, below 40%, 50%, 60%. 70%, 80%, etc., of fully charged), and the battery(ies) 150 will not receive voltage from the starter-generator 22 at a high level that will charge the battery(ies) 150 too rapidly, causing damage to, and shortening the life of, the battery(ies) 150. The desired SOC range within which the continuous voltage regulation system 154 maintains the battery(ies) 150, via execution of the starter-generator control program(s)/algorithm(s), can be any desired range that has been programmed, or is programmable, into the ISCU 130. For example, in various embodiments, the desired SOC range can be 40%-100% or full charge, or 50%-100% of full charge, or 60%-100% of full charge, or 70%-100% of full charge, etc.

In various instances, the continuous voltage regulation system 154 operates as follows. When the ICE 18 is operating, the ICE 18 drives the starter-generator 22 (e.g., provides rotational torque utilized to turn/rotate the rotor of the starter-generator 22), whereby the starter-generator 22 generates electrical energy (i.e., voltage and/or current). The electrical energy (i.e., voltage and/or current) generated by the starter-generator 22 is input to the ISCU 130 where the ISCU 130 reads the electrical energy presently being produced and the real time SOC of the battery(ies) 150. Then, based on the real time SOC readings from the battery(ies) 150 and execution of the starter-generator control program(s)/algorithm(s), the ISCU 130 controls operation of the starter-generator 22, and hence the electrical energy generated by the starter-generator 22. Specifically, the ISCU 130 continually monitors and regulates or controls (i.e., increases, decreases and/or maintains) the amount of electrical energy being provided to battery(ies) 150 during operation of the ICE 18. More specifically, the ISCU 130 continuously monitors and controls operation of the starter-generator 22, and hence regulates the amount of electrical energy generated by the starter-generator 22, in accordance with a selected charge profile such that the starter-generator 22 generates a real time continuously variable level, or amount, of electrical energy that will charge the battery(ies) 150 at continuously variable rate that will maintain the SOC within the desired pre-determined/pre-set/pre-programmed range (e.g., between 70%-100% of full charge) during operation of the ICE 18.

For example, in the various embodiments wherein the starter-generator 22 is a 3-phase brushless DC motor, the 3-phase electrical energy generated by the starter-generator 22 (e.g., 3-phase AC electrical energy) is input to the ISCU 130 via the 3-phase lines U, V and W. Subsequently, via sequencing of the multi-phase coils of the starter-generator 22, the ISCU 130 continuously controls operation of the starter-generator 22, and hence continuously regulates the electrical energy generated by the starter-generator 22, based on the continuous SOC readings from the battery (ies) 150 and execution of the starter-generator control program(s)/ algorithm(s). More specifically, during operation of the ICE 18, the ISCU 130 continuously controls operation of the starter-generator 22, and hence continuously regulates the electrical energy generated by the starter-generator 22, such that the starter-generator 22 generates a real time continuously variable level, or amount, of electrical energy that will charge the battery (ies) 150 in accordance with the programed charge profile. The ISCU 130 then converts the 3-phase AC electrical energy to DC electrical energy that is input to the battery (ies) 150. Therefore, the battery (ies) SOC is continuously monitored and maintained within the pre-determined/pre-set/pre-programmed SOC range during operation of the ICE 18.

In various instances, the ISCU 130 can further utilize feedback from the starter-generator 22 to continuously control the electrical energy generated by the starter-generator 22, and hence continuously regulate the electrical energy provided to the battery(ies) 150. The feedback from the starter-generator 22 can comprise any information or data regarding any operational parameter of the starter-generator 22, such as feedback regarding pole positions within a 3-phase starter-generator 22. For example, via execution of the starter-generator control program(s)/algorithm(s), the ISCU 130 can utilized the 3-phase pole position data to control the current provided to the 3-phase coils in order to achieve the desired AC waveform that can be transformed into the desired DC voltage output from the ISCU 130 to the battery(ies) 150 in order to charge the battery(ies) 150 in accordance with the programed charge profile, as described above.

Hence, as described above with regard to the various embodiments, the continuous voltage regulation system 154 employs a feedback control (e.g., real time SOC feedback from the battery(ies) 150, and in various instances feedback from the starter-generator 22) that enables the battery charging voltage provided to the battery(ies) 150 to be continuously regulated, via the ISCU 130, based on the real time SOC of the battery(ies) 150, while the ICE 18 is operating. For example, when the ICE 18 is operating and the battery(ies) 150 SOC is outside of the desired SOC range, e.g., below a lower threshold or limit of the desired SOC range (e.g., below 70% of full charge), the ISCU 130 can increase the regulated voltage output to the battery(ies) 150 to provide quicker battery charging. And, when the SOC of the battery(ies) 150 is within a desired range (e.g., 70%-100% of full charge), the ISCU 130 can lower the voltage output to the battery(ies) 150 to a "float voltage" that will maintain the battery(ies) SOC within the desired range. Accordingly, if the ISCU 130 senses the SOC of battery(ies) is decaying, the ISCU 130, via execution of the starter-generator control program(s)/algorithm(s), can increase the regulated voltage until the SOC is trending upward, and then when the SOC is within the desired range, the ISCU 130 can drop the voltage output to a voltage that will maintain SOC within the desired range until the SOC again falls below the lower threshold of the desired SOC range.

In addition to the battery(ies) 150 SOC and the feedback from the starter-generator 22 described above, it is envisioned that in various embodiments the continuous voltage regulation system 154 can utilize any other vehicle information, data and/or parameter input and/or continuous feedback from any other vehicle system, device, sensor, computer based module (e.g., an engine control unit (ECU) 166 describe further below) communicatively linked with the ISCU 130, to continuously regulate the battery charging voltage while the ICE 18 is operating, as described above. For example, the ISCU 130 can receive ICE 18 operating data and/or parameters from the ECU 166; or can receive or determine ground speed information from a ground speed sensor or utilizing GPS positional reading from a GPS device of the vehicle 10; or can receive information and data regarding the present load on the battery(ies) 150; and utilize such information, data and/or parameters to continuously regulated the charging voltage generated by the starter-generator 22 while the ICE 18 is operating, as described above.

In addition to extending the life of the battery(ies) 150 over that of battery(ies) of vehicles with known battery charging systems, an exemplary advantage of the continuous voltage regulation system 154 is that by incorporating the continuous voltage regulation system 154 into the vehicle 10 (e.g., a golf car) the capacity of the battery(ies) 150 can be reduce from that of vehicles with known battery charging system. For example, it is envisioned that by implementing the continuous voltage regulation control provided by the continuous voltage regulation system 154 of the present disclosure, the capacity of the battery(ies) 150 can be reduced by 30%-60% of the battery(ies) of vehicles with known battery charging system. For example, the standard battery capacity for vehicles with known battery charging system is about 500-600 cold cranking amps with 80-90 minute reserve capacity. However, by implementing the continuous voltage regulation control provided by the continuous voltage regulation system 154 of the present disclosure the battery(ies) 150 can have a capacity of 250-400 cold cranking amps with a reserve capacity of 20-40 minutes.

Although the continuous voltage regulation system 154 of the present disclosure has been exemplarily described herein to include the starter-generator 22, it is envisioned that continuous voltage regulation system 154 can be implemented in a vehicle 10 (e.g., a golf car) that incorporates separate starter and generator systems, and remain within the scope of the present disclosure. That is, in such instances, the continuous voltage regulation system 154 would comprise the ISCU 130 and generator motor that is operated only to generate electrical energy to charge the battery(ies) 150. Such embodiments are within the scope of the present disclosure.

Referring now to FIGS. 1 and 4, in various embodiments, the vehicle 10 (e.g., a golf car) can further comprises a global position system (GPS) enhanced fleet management system 158 that is structured and operable to use GPS position data to control the operation of the engine 18 and/or other systems of the vehicle 10 (e.g., passenger information systems). The GPS enhanced fleet management system (GPSEFMS) 158 is communicatively connected to a GPS sensor 162 disposed on the vehicle 10 that is structured and operable to send and receive vehicle position signals from one or more GPS satellite. The GPSEFMS 158 is a computer based module that is communicatively connected to a vehicle data network 160 (e.g., a controller area network (CAN) bus, or other communication bus). The vehicle 10 additionally comprises a computer based engine control unit (ECU) 166 that is communicatively connected to the ICE 18 and is structured and operable to control operation of the ICE 18 via control of various ICE systems and parameters such as fuel supplied to the ICE 18 and/or ignition timing of the ICE 18. Generally, the GPS sensor 162 communicates with the GPS satellite to receive geospatial position data of the vehicle 10 which is then sent the GPSEFMS 158. Thereafter, the GPSEFMS 158 utilizes the geospatial positional data to determine the present geospatial location of the vehicle 10 (e.g., the location of a respective golf car on a golf course) and based on the determined geospatial location of the vehicle 10, the GPSEFMS 158 sends command signals to the ECU 166 instructing the ECU 166 to control operation of the ICE 18, and hence operation of the vehicle 10, in accordance with certain predetermined operation profiles (e.g., predetermined set of ICE operation rules).

More particularly, the GPSEFMS 158 comprises at least one processor operable to execute various programs or algorithms to control various operations of the vehicle 10, For example, the GPSEFMS 158 executes one or more fleet management control program or algorithm in order control operation of the ICE 18, and hence operation of the vehicle 10, based on the geospatial location of the vehicle 10. For example, in various instances the GPSEFMS 158 executes the fleet management control program(s) or algorithm(s) to monitor the geospatial location of the vehicle 10, and control operation of the ICE 18 such that when the geospatial location of the vehicle 10 is within certain geospatial areas or regions (e.g., unrestricted areas or regions) the ICE 18 is controlled, via execution of the fleet management control program(s) or algorithm(s), to operate in accordance with a certain predetermined operation profile. However, when the geospatial location of the vehicle 10 is within other certain geospatial areas or regions (e.g., restricted areas or regions) the ICE 18 is controlled, via execution of the fleet management control program(s) or algorithm(s), to operate in accordance with a certain other predetermined operation profiles.

For example, as described above, in certain instances, the vehicle 10 can be a golf car. In such instances, the GPSEFMS 158 executes the fleet management control program(s) or algorithm(s) to monitor the geospatial location of the golf car 10 within a particular golf course, and control operation of the ICE 18 such that when the geospatial location of the golf car 10 indicates that the golf car 10 is within certain permitted access areas or regions (e.g., cart paths, fairways, and other areas of permitted golf car access) the ICE 18 is controlled, via execution of the fleet management control program(s) or algorithm(s), to operate in accordance with one or more 'permitted access' operation profile(s). However, when the geospatial location of the golf car 10 indicates that the golf car 10 is near, is entering and/or within a limited, restricted or non-permitted access area (e.g., T-boxes, greens, green fringe, Out-Of-Bounds, areas under repair, etc.) the ICE 18 is controlled, via execution of the fleet management control program(s) or algorithm(s), to operate in accordance with one or more limited access, restricted access and/or non-permitted access operation profile(s).

An example of a 'permitted access' operation profile can be that when the monitored geospatial location of the golf car 10 indicates that the golf car 10 on an allowed cart path, the GPSEFMS 158 sends instructions/command to the ECU 166 to control operation of the ICE 18 (e.g., control the fuel input and/or ignition timing) in accordance with a 'cart path' operation profile, whereby the ICE 18 is allowed to operate (within certain parameters) according to vehicle operator inputs (e.g., accelerator pedal and brake pedal inputs by the vehicle driver). For example, when such a 'cart path' operation profile is being implements, the GPSEFMS 158 can send instructions/command to the ECU 166 to control operation of the ICE 18 such that the RPM of the ICE 18 do not exceed a certain maximum cart path speed operation threshold, and/or such that the golf car 10 is not allowed to exceed a certain predefined maximum cart path ground speed. For example, when the golf car 10 is on determined to be on a cart path the GPSEFMS 158, via the ECU 166, allows the driver to drive the golf car 10 as fast or as slow as the driver desires without exceeding a predetermined ICE RPM or vehicle ground speed.

An example, of a 'non-permitted access' operation profile can be that when the monitored geospatial location of the golf car 10 indicates the golf car 10 is approaching or has entered a non-permitted access area such as a green, the GPSEFMS 158 sends instructions/command to the ECU 166 to control operation of the ICE 18 (e.g., control the fuel input and/or ignition timing) in accordance with a 'greens' operation profile, whereby operation of the ICE 18 is limited and/or at least temporarily ceased regardless of vehicle operator inputs (e.g., regardless of accelerator pedal and brake pedal inputs by the vehicle driver). For example, when such a 'greens' operation profile is being implements, the GPSEFMS 158 can send instructions/commands to the ECU 166 to control operation of the ICE 18 such that operation of the ICE 18 is at least temporarily ceased, and/or such that the RPM of the ICE 18 are automatically reduced and not allowed to exceed a certain greens threshold, and/or such that the golf car 10 is automatically reduced and not allowed to exceed a certain predefined ground speed. For example, when the golf car 10 is determined to be approaching geofenced area around a green or other non-permitted access area (e.g., an area around the green or other non-permitted access area for which the geospatial coordinates have been stipulated to define an area in which the golf car is not permitted), the GPSEFMS 158, via the ECU 166, can reduce the RPM of ICE 18 (e.g., via fuel input reduction and/or ignition timing retardation) to automatically slow the ground speed of the golf car 10. In various instance, the GPSEFMS 158, via communication with a vehicle driver display over the vehicle data network 160, can inform the driver that the golf car 10 is about to enter a non-permitted access area. Subsequently, if the golf car 10 enters the geofenced area around green (or other non-permitted access area), the GPSEFMS 158, via the ECU 166, can further reduce the RPM of ICE 18 or at least temporarily cease operation of the ICE 18 such that the golf car 10 is not allowed to proceed further into the geofenced area, and the GPSEFMS 158, via communication with the vehicle driver display, can instruct the driver that he/she must immediately exit the non-permitted access area. Thereafter, the GPSEFMS 158, via the ECU 166, can allow minimal ICE operation sufficient to exit the non-permitted access area (e.g., the geofenced area) without proceeding further into the non-permitted access area (e.g., the geofenced area).

As used herein, a geofenced area will be understood to mean any predetermined area for which the geospatial coordinates have been stipulated to define an area in which the GPSEFMS 158 will employ a predetermine set of vehicle operation rules, e.g., an operation profile. That is, a geofenced area is an area where a particular set of rule(s) or action(s) have been defined and will be implemented by the GPSEFMS 158 if the vehicle 10 enters the respective area. The GPSEFMS 158 can store a plurality of predefined geofenced areas with corresponding sets of operation rules or profiles that are applied when the geofenced areas are entered by the vehicle 10. For example, as described above, a geofenced area can be any a limited access, restricted access and/or non-permitted access area where the vehicle 10 is not permitted to travel, whereupon entrance the implements a 'non-permitted access' operation profile, or set of rules, as described above. Or, a geofenced area can be an area where some aspect of the vehicle operation is limited upon entrance by the vehicle 10. For example, a set of operation rules or profile can be executed to limit the vehicle ground speed when the vehicle 10 enters an area where pedestrian traffic is high (e.g., near a golf course club house). Or, a geofenced area can be an area whereupon it is desired to have a notice, information, or advertisement displayed on the vehicle driver display when the vehicle enters. For example, a set of operation rules or profile can cause information regarding the availability of food, beverages, apparel, equipment, etc. when a golf car is approaching a golf course club house.

Referring now to FIGS. 1, 4 and 5, FIG. 5 provides an exemplary flow chart 200 of the operation of the GPSEFMS 158 when executing the fleet management control program(s) or algorithm(s), in accordance with various embodiments of the present disclosure. As described above, when executing the fleet management control program(s) or algorithm(s), the GPSEFMS 158 communicates with the GPS sensor 162 to receive geospatial positional data of the vehicle 10, whereby the GPSEFMS 158 monitors the geospatial location of the vehicle 10, as indicated at 202. Then, based on the geospatial location of the vehicle 10, the GPSEFMS 158 determines if the vehicle 10 is near or inside a geofenced area (e.g., a limited access, restricted access and/or non-permitted access area), as indicated at 204. If the vehicle 10 has not entered a geofenced area, the GPSEFMS 158 continues to monitor the geospatial location of the vehicle 10, as indicated at 204A. However, if the vehicle 10 has entered a geofenced area, the GPSEFMS 158 will evaluate the vehicle operation rules or profile corresponding to the respective geofenced area, as indicated at 204B and 206. Then, the GPSEFMS 158 determines whether the respective operation rules or profile 1) require a reduction of vehicle ICE speed (e.g., RPM reduction) and/or vehicle ground speed reduction, as described above with regard to a non-permitted access area, or 2) do not require a vehicle ICE speed and/or vehicle ground speed, but rather require other vehicle operations be implemented, as described above with regard to areas where information can be displayed on the driver display, as indicated at 208. If vehicle ICE speed and/or vehicle ground speed reduction is not required, but rather implementation of other vehicle operations is required, the GPSEFMS 158 executes the respective set of rules and returns to monitoring the geospatial location of the vehicle 10, as indicated at 208A and 210.

However, if the respective operation rules or profile require a reduction of vehicle ICE speed (e.g., RPM reduction) and/or vehicle ground speed reduction, the GPSEFMS 158 sends the respective ICE speed control commands to the ECU 166, via the vehicle data network 160, as indicated at 208B and 212. Thereafter, the ECU 166 receives the speed control commands from the GPSEFMS 158, via the vehicle data network 160, and executes the speed control commands (e.g., reduce fuel input and/or retard ignition timing) to alter the operation/performance of the ICE 18, as indicated at 214 and 216. Next, the ECU 166 monitors the ICE 18 operation to verify the ICE 18 performance has been altered in accordance with the speed control commands and sends one or more speed reduction confirmation to the GPSEFMS 158, via the vehicle data network 160, as indicated at 218. The GPSEFMS 158 then re-evaluates the geospatial location of the vehicle 10 and determines whether the vehicle 10 has moved to a location where certain vehicle speed restore criteria, of the respective operation profile are satisfied such that the ICE 18 operation/performance can be restored to the previous ICE 18 operation parameters, as indicated a 220 and 222. If the vehicle speed restore criteria has not been met, the GPSEFMS 158 continues to re-evaluate the geospatial location of the vehicle 10 until it is determined that the vehicle 10 has moved to a location where certain vehicle speed restore criteria are satisfied, as indicated at 222A. If the vehicle speed restore criteria has been satisfied, the GPSEFMS 158 sends a speed restore command, and/or other vehicle operation restore command, to the ECU 166, via the vehicle data network, as indicated at 222B and 224. Subsequently, the ECU 166 receives and executes the speed restore command, thereby restoring the previous ICE 18 operation parameters, as indicated at 226 and 228. The ECU 166 then verifies that the previous ICE 18 operation parameters have been restored and the ECU 166 sends a restore confirmation over the vehicle data network to the GPSEFMS 158, as indicated at 230, whereafter the GPSEFMS 158, via communication with the GPS sensor 162, again monitors the geospatial location of the vehicle 10, as indicated a 202.

In addition to the operation of the GPSEFMS 158 for controlling operation of the vehicle 10 as described above, it is envisioned that various vehicle systems, modules, components, sensors, etc, (e.g., the driver display, an ICE temperature sensor, oil level sensor, etc.) that are communicatively connected to the GPSEFMS 158 via the vehicle data network 160 can send various vehicle operation data and telemetry to the GPSEFMS 158 and/or receive data and information from the GPSEFMS 158. The GPSEFMS 158 can communicate such vehicle operation data and telemetry to a remote location, e.g., a Cloud server, for storage and/or analysis, or the GPSEFMS 158 can store and/or analyze such vehicle operation data and telemetry locally, e.g., within the GPSEFMS 158. For example, all diagnostic data and telemetry captured by the ECU 166 during operation of the ICE 18 can be communicated to the GPSEFMS 158 via the vehicle data network. Hence, by utilizing the vehicle data network 160 to provide communication between the GPSEFMS 158 and the ECU 166, engine diagnostic data and telemetry can now be captured by the GPSEFMS 158 and utilized for such things troubleshooting and/or implementing various vehicle preventative/scheduled maintenance operation rules. For example the GPSEFMS 158 can implement a set of ICE 18 preventative/scheduled maintenance rules that limit ICE 18 RPM if a predetermined ICE 18 operating temperature is exceeded, or if a maintenance interval is exceeded (e.g., an oil change interval).

As described above, in various instances, the vehicle ground speed is utilized as input to one or more of the vehicle 10 systems described above. For example, in various instances described above, the GPSEFMS 158 can employ a set of vehicle operation rules or profile that utilize and control the ground speed of the vehicle 10. It is envisioned that in such instances, the GPSEFMS 158, can determine the vehicle ground speed using the GPS data received from the GPS satellite.

Referring now to FIGS. 7 through 10, as described above, in various embodiments, the vehicle 10 (e.g., a golf car) comprises a control module (e.g., the PMCM 126, ECU 166, ISCU 130, or a combination of modules), an operators seating area/passenger compartment 36, operator controls (e.g., the vehicle On/Off Key Switch 42, accelerator pedal 62, brake pedal 58, steering wheel 54), the ICE 18 operably connected to the driveline 26, wherein the ICE 18 is structured and operable to generate and deliver power to the driveline 26. The vehicle 10 can additionally comprise a plurality of sensors, (e.g., an engine rpm sensor, a fuel level sensor, the throttle body sensor 146, an ICE temperature sensor, an oil level sensor, etc.) that are communicatively connected to the control module (e.g., the PMCM 126, ECU 166, ISCU 130, or a combination of modules) and can send various vehicle operation data to the control module, the starter motor 22 operably coupled with the ICE 18 and structured and operable to start the ICE 18, and the battery(ies) 150 structured and operable to provide electrical energy to the starter motor 22 for starting the ICE 18 and powering additional electrical loads on the vehicle 10. In some embodiments the control module monitors the operator controls and one or more of the various vehicle sensors to trigger vehicle faults.

FIGS. 7, 8, 9 and 10 respectively provide flow charts 400, 500, 600 and 700 that illustrate various examples of fault logic executed by the control module (e.g., the PMCM 126, ECU 166, ISCU 130, or a combination of modules). For example, the flow chart 400 of FIG. 7 exemplarily illustrates that in a vehicle pedal start application the control module will register an accelerator pedal fault if the On/Off Key Switch 42 is switched to the On position and the accelerator pedal switch is Closed before a timer threshold (e.g., 250 ms-1000 ms, 250 ms) expires. Or, for example, the flow chart 500 of FIG. 8 exemplarily illustrates that in some embodiments the control module (e.g., the PMCM 126, ECU 166, ISCU 130, or a combination of modules) will register a throttle fault to prevent the ICE 18 from starting when there is an increased throttle command without actuation of the accelerator pedal. More particularly, a throttle fault occurs when the throttle position sensor (e.g. the throttle body position sensor 146) registers a throttle input signal above a threshold voltage and the accelerator pedal switch is Open. Or, for example, the flow chart 600 of FIG. 9 exemplarily illustrates that in some embodiments, while the ICE is running the control module (e.g., the PMCM 126, ECU 166, ISCU 130, or a combination of modules) monitors throttle position, the accelerator pedal switch, and the ICE RPM to register faults (e.g., a throttle fault), stop fuel, stall the ICE 18, clear faults (e.g., return to standby mode), or continue normal ICE 18 run mode.

Furthermore, the flow chart 700 of FIG. 10 exemplarily illustrates that in various embodiments, the control module (e.g., the PMCM 126, ECU 166, ISCU 130, or a combination of modules) recognizes when the ICE 18 stalls and there are no faults detected. In response to such an ICE 18 stall without faults detected (e.g., the vehicle 10 runs out of fuel while the ICE 18 is running), the control module will enter standby mode if the accelerator pedal switch is Open. Alternatively, if the accelerator pedal switch remains Closed after an ICE 18 stall without faults detected, the control module will wait for ICE 18 RPM to decrease below a threshold (e.g., 900 RPM) and then attempt to start the ICE 18 (e.g., supply power to the starter motor 22) for a defined time period (e.g., 6 seconds). If the ICE 18 does not start after the time period has elapsed, the control module will discontinue the start procedure and enter standby mode.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A method for controlling the operation of a gas powered golf car, said method comprising:

receiving human golf car operator inputs;

communicatively connecting a global positioning system enhanced fleet management system (GPSEFMS) of a golf car with an internal combustion engine control unit (ECU) of the golf car via a golf car data network of the golf car, the ECU structured and operable to control operation of an internal combustion engine of the golf car in response to the human golf car operator inputs, wherein the GPSEFMS, the ECU and the golf car data network are disposed on the golf car, and the GPSEFMS comprises at least one processor structured and operable to execute one or more fleet management control program and a plurality of predetermined geofenced area operation profiles stored within the GPSEFMS;

operating the internal combustion engine in response to the human golf car operator inputs in accordance with predetermined non-geofenced area operation parameters that are specific to a non-geofenced area of a golf course on which the golf car is operating;

via execution of the one or more fleet management control program by the GPSEFMS, monitoring a location of the golf car as the golf car is moving in response to the human golf car operator inputs utilizing geospatial position data communicated from a global position sensor disposed on the golf car to the GPSEFMS via the golf car data network;

via execution of the one or more fleet management control program by the GPSEFMS, using the geospatial position data to determine that the golf car is entering a geofenced area;

via execution of the one or more fleet management control program by the GPSEFMS, sending control commands to the ECU via the golf car data network limiting operation of the internal combustion engine in response to the human golf car operator inputs;

limiting operation of the golf car in response to the human golf car operator inputs, via the limited operation of the internal combustion engine, in accordance with one of the plurality of predetermined geofenced area operation profiles stored within the GPSEFMS disposed on the golf car that is specific to the geofenced area;

via execution of the one or more fleet management control program by the GPSEFMS, continuing to monitor a subsequent location of the golf car utilizing the geospatial position data communicated from the global position sensor after the GPSEFMS has sent the control commands to the ECU limiting operation of the internal combustion engine in response to the human golf car operator inputs in accordance with the predetermined geofenced area operation profile;

via execution of the one or more fleet management control program by the GPSEFMS, utilizing the subsequent location of the golf car to evaluate golf car operation restore criteria of the predetermined geofenced area operation profile to determine that the restore criteria has been satisfied based on the subsequent location of the golf car;

via execution of the one or more fleet management control program by the GPSEFMS, when the restore criteria has been satisfied, initiating and sending a restore command to the ECU via the golf car data network to restore operation of the internal combustion engine in response to the human golf car operator inputs to the non-geofenced area operation parameters;

via execution of the one or more fleet management control program by the GPSEFMS, restoring operation of the internal combustion engine in response to the human golf car operator inputs to the non-geofenced area operation parameters in response to the restore command;

via execution of the one or more fleet management control program by the GPSEFMS, verifying that operation of the internal combustion engine in response to the human golf car operator inputs has been restored to the non-geofenced area operation parameters in response to the restore command.

2. The method of claim 1, wherein sending control commands to the ECU via the golf car data network controlling operation of the internal combustion engine in accordance with the predetermined geofenced area operation profile specific to the geofenced area comprises:

via execution of the one or more fleet management control program by the GPSEFMS, evaluating the predetermined geofenced area operation profile specific to the geofenced area to determine when a reduction in speed of the internal combustion engine is required by the operation profile; and via execution of the one or more fleet management control program by the GPSEFMS, sending one or more internal combustion engine speed reduction command to the ECU via the golf car data network altering one or more operational parameter of the internal combustion engine to reduce the speed of the internal combustion engine; and altering the one or more operational parameter of the internal combustion engine to reduce the speed of the internal combustion engine.

3. The method of claim 2, wherein sending one or more internal combustion engine speed reduction command to the ECU via the golf car data network altering one or more operational parameter of the internal combustion engine to reduce the speed of the internal combustion engine comprises;

sending a speed reduction command to the ECU via the golf car data network retarding the ignition timing of the internal combustion engine; and retarding the ignition timing of the internal combustion engine.

4. The method of claim 2, wherein sending one or more internal combustion engine speed reduction command to the ECU via the golf car data network altering one or more operational parameter of the internal combustion engine to reduce the speed of the internal combustion engine comprises;

sending a speed reduction command to the ECU via the golf car data network reducing the amount of fuel supplied to the internal combustion engine; and reducing the amount of fuel supplied to the internal combustion engine.

5. The method of claim 1, wherein sending control commands to the ECU via the golf car vehicle data network controlling operation of the internal combustion engine in accordance with predetermined geofenced area operation profile specific to the geofenced area comprises:

via the GPSEFMS, evaluating the predetermined geofenced area operation profile specific to the geofenced area to determine if a reduction of a ground speed of the golf car is required by the operation profile;

via the GPSEFMS, sending one or more internal combustion engine speed reduction command to the ECU via the golf car data network altering one or more operational parameter of the internal combustion engine to reduce the ground speed of the golf car; and altering the one or more operational parameter of the internal combustion engine to reduce the ground speed of the golf car.

6. The method of claim 5, wherein the ground speed of the golf car can be monitored via the GPSEFMS using the geospatial position data communicated from a global position sensor.

7. The method of claim 1, wherein sending control commands to the ECU via the golf car data network controlling operation of the internal combustion engine in accordance with the predetermined geofenced area operation profile specific to the geofenced area comprises sending control commands to a driver display of the golf car via the golf car data network to provide information to a driver of the golf car.

8. The method of claim 1, wherein utilizing the subsequent location of the golf car to evaluate golf car operation restore criteria of the predetermined geofenced area operation profile to determine that the restore criteria has been satisfied based on the subsequent location of the golf car comprises evaluating the golf car operation restore criteria of the predetermined geofenced area operation profile to determine that the restore criteria has been satisfied while the golf car is within a geofenced area and the GPSEFMS is controlling operation of the internal combustion engine in accordance with the predetermined geofenced area operation profile.

9. A gas powered golf car, said golf car comprising:

an internal combustion engine structured and operable to generate motive power to the golf car;

an engine control unit (ECU) structured and operable to control operation of the internal combustion engine;

a global position sensor structured and operable to communicate with a GPS satellite to receive geospatial position data identifying the geospatial location of golf car; and a GPS enhanced fleet management system (GPSEFMS) communicatively connected to the global position sensor and to the ECU, the GPSEFMS comprising at least one processor structured and operable to execute one or more fleet management control program and a plurality of predetermined geofenced area operation profiles stored within the GPSEFMS, wherein via execution of the one or more fleet management control program by the GPSEFMS, the GPSEFMS is structured and operable to:

operate the internal combustion engine in response to a human golf car operator inputs in accordance with predetermined non-geofenced area operation parameters that are specific to a non-geofenced area of a golf course on which the golf car is operating;

monitor a location of the golf car as the golf car is moving in response to the human golf car operator inputs utilizing geospatial position data communicated from the global position sensor;

determine when the golf car is entering a geofenced area using the geospatial position data to determine; and

send control commands to the ECU via the golf car data network limiting operation of the internal combustion engine in response to the human golf car operator inputs, and limit operation of the golf car in response to the human golf car operator inputs, in accordance with one of the predetermined geofenced area operation profiles that is specific to the geofenced area, when it is determined that the golf car is entering the geofenced area;

continue to monitor a subsequent location of the golf car utilizing the geospatial position data communicated from the global position sensor after the GPSEFMS has sent the control commands to the ECU limiting operation of the internal combustion engine in response to the human golf car operator inputs in accordance with the predetermined geofenced area operation profile;

utilize the subsequent location of the golf car to evaluate golf car operation restore criteria of the predetermined geofenced area operation profile to determine when the restore criteria has been satisfied, based on the subsequent location of the golf car;

initiate and send a restore command to the ECU via the golf car data network to restore operation of the internal combustion engine in response to the human golf car operator inputs to the non-geofenced area operation parameters when the restore criteria has been satisfied, and restore the operation of the internal combination engine in response to the human golf car operator inputs to the non-geofenced area operation parameters in response to the restore command; and

verify that operation of the internal combustion engine in response to the human golf car operator inputs has been restored to the non-geofenced area operation parameters in response to the restore command.

10. The golf car of claim 9, wherein, via execution of the one or more fleet management control program by the GPSEFMS, the GPSEFMS is further structured and operable to:

evaluate the predetermined geofenced area operation profile specific to the geofenced area to determine when a reduction in speed of the internal combustion engine is required by the operation profile;

send one or more internal combustion engine speed reduction command to the ECU via the golf car data network altering one or more operational parameter of the internal combustion engine to reduce the speed of the internal combustion engine; and alter the one or more operational parameter of the internal combustion engine to reduce the speed of the internal combustion engine.

11. The golf car of claim 9, wherein via execution of the one or more fleet management control program by the GPSEFMS, the GPSEFMS is further structured and operable to evaluate golf car operation restore criteria of the predetermined geofenced area operation profile to determine when the restore criteria has been satisfied, based on the subsequent location of the golf car while the golf car is within a geofenced area and the GPSEFMS is controlling operation of the internal combustion engine in accordance with the predetermined geofenced area operation profile.

* * * * *